United States Patent
Carrick et al.

(10) Patent No.: US 11,889,784 B1
(45) Date of Patent: Feb. 6, 2024

(54) METHOD AND APPARATUS FOR UTILIZING A LOWER PARALLEL PLANTING ARM

(71) Applicant: G.B.G.I., Inc., Chardon, OH (US)

(72) Inventors: William Carrick, Chardon, OH (US); Peter T. Casamento, Solon, OH (US)

(73) Assignee: G.B.G.I., Inc., Chardon, OH (US)

( * ) Notice: Subject to any disclaimer, the term of this patent is extended or adjusted under 35 U.S.C. 154(b) by 0 days.

(21) Appl. No.: 18/086,006

(22) Filed: Dec. 21, 2022

Related U.S. Application Data

(60) Provisional application No. 63/398,946, filed on Aug. 18, 2022.

(51) Int. Cl.
| | | |
|---|---|---|
| *A01B 63/00* | (2006.01) | |
| *A01C 7/20* | (2006.01) | |

(52) U.S. Cl.
CPC ............ *A01C 7/203* (2013.01); *A01B 63/008* (2013.01); *A01C 7/201* (2013.01); *A01C 7/205* (2013.01)

(58) Field of Classification Search
CPC ......... A01C 7/201; A01C 7/203; A01C 7/205; A01B 63/008
See application file for complete search history.

(56) References Cited

U.S. PATENT DOCUMENTS

| | | | | |
|---|---|---|---|---|
| 4,183,195 | A * | 1/1980 | James | A01D 34/866 56/10.4 |
| 6,986,313 | B2 * | 1/2006 | Halford | A01C 7/06 111/151 |
| 7,392,754 | B2 * | 7/2008 | Flikkema | A01B 63/26 111/63 |
| 9,814,172 | B2 * | 11/2017 | Achen | A01C 7/203 |
| 10,190,627 | B2 * | 1/2019 | Sivinski | A01B 59/002 |
| 10,779,463 | B2 * | 9/2020 | Sivinski | A01B 61/04 |
| 2018/0103573 | A1 * | 4/2018 | Sivinski | A01C 1/00 |
| 2021/0251127 | A1 * | 8/2021 | Pearson | A01B 63/008 |

FOREIGN PATENT DOCUMENTS

| | | | | |
|---|---|---|---|---|
| EP | 2823701 | | 1/2015 | |
| EP | 2823701 A1 | * | 1/2015 | ............ A01C 7/205 |
| KR | 100836587 B | * | 6/2008 | |
| WO | WO-2016048167 A1 | * | 3/2016 | .......... A01B 61/046 |
| WO | 2019232592 | | 12/2019 | |

OTHER PUBLICATIONS

New GBGI Parallel Arms For John Deere Planter; AGDealer.com; https://www.agdealer.com/detail/1099049/new-gbgi-parallel-arms-for-john deere-planter, Dec. 30, 2022.
International Searching Authority, International Search Report, pp. 1-9, dated Sep. 20, 2023.

* cited by examiner

*Primary Examiner* — Alicia Torres
(74) *Attorney, Agent, or Firm* — Sand, Sebolt & Wernow Co., LPA

(57) ABSTRACT

A lower planting arm of a row unit. The lower planting arm includes a first linkage arm. The lower planting arm also includes a second linkage arm parallel with the first linkage arm. The lower planting arm also includes a first bracket fixedly engaging with the first linkage arm and the second linkage arm at a first position. The lower planting arm also includes a second bracket fixedly engaging with the first linkage arm and the second linkage at a second position opposite to the first position. Each of the first bracket and the second bracket of the lower planting arm is adapted to operably engage with an actuating device of the row unit.

26 Claims, 9 Drawing Sheets

METHOD AND APPARATUS FOR UTILIZING A LOWER PARALLEL PLANTING ARM

REFERENCE TO RELATED APPLICATIONS

This application claims the benefit of U.S. Provisional Application Ser. No. 63/398,946, filed on Aug. 18, 2022; the disclosure of which is incorporated herein by reference.

TECHNICAL FIELD

This disclosure is directed to a lower planting arm of a farming implement.

BACKGROUND ART

Planters, seed drills, and similar farming implements of the like are utilized in sowing or drilling various types of seeds in equal distance rows throughout a field. In order to sow or drill various types of seeds throughout a field, these types of farming implements utilize various machines, including row units, to achieve accurate and precise planting of seeds. In regards to row units, row units are equipped with various assemblies, parts, and mechanisms to accurately sow seeds at equal distance rows throughout a field. During these farming operations, the row units provided on these farming implements experience varying terrain and ground undulation as these row units travel across a field. Such experience of varying terrain and ground undulation may cause the row units to inaccurately sow seeds into the ground at inappropriate depths, which could stunt the growth of seeds due to lack of receiving essential nutrients and water during the growing process.

To combat this issue, row units generally include parallel linkage assemblies that operably engage the row units with a main support of the farming implement. These parallel linkage assemblies enable the row units to travel across a field at suitable depths when traversing varying terrain and ground undulation provided on the field. To ensure the row units are maintained at suitable depths, actuating device may be operably engaged with the parallel linkage assemblies to provide suitable downforce on the row unit. Generally, however, current practices of engaging these actuating devices with commercially parallel linkage assemblies require additional linkage arms and/or components for these parallel linkage assemblies. With such additional linkage arms and/or components for these parallel linkage assemblies, operators of these row units must dissemble and/or reconfigure their row units, which creates longer downtime of planters and reductions in planting operations.

SUMMARY OF THE INVENTION

The presently disclosed lower planting arm assembly enables an operator to quickly assemble an actuating device to row unit by removing additional components and/or parts required in conventional parallel linkage assemblies. The presently disclosed lower planting arm assembly includes a lower planting arm that operably engages with a head frame of a preexisting unit shank of a row unit and a mounting plate of a preexisting parallel linkage assembly of the row unit to enable engagement of an actuating device. The presently disclosed lower planting arm also includes a first bracket configured to operably engage with an actuating device, and a second bracket opposite to the first bracket and configured to operably engaged with a suitable farming component of the row unit. As such, the lower planting arm assembly disclosed herein addresses some of the inadequacies of previously known lower planting arm assembly.

In one aspect, an exemplary embodiment of the present disclosure may provide a lower planting arm of a row unit. The lower planting arm comprises a first linkage arm; a second linkage arm parallel with the first linkage arm; a first bracket fixedly engaging with the first linkage arm and the second linkage arm at a first position; and a second bracket fixedly engaging with the first linkage arm and the second linkage at a second position opposite to the first position; wherein each of the first bracket and the second bracket is adapted to operably engage with an actuating device of the row unit.

This exemplary embodiment or another exemplary embodiment may further include that the first linkage arm, the second linkage arm, the first bracket, and the second bracket collectively define a single, monolithic member. This exemplary embodiment or another exemplary embodiment may further include that the first linkage arm, the second linkage arm, the first bracket, and the second bracket collectively define a substantially parallelogram shape. This exemplary embodiment or another exemplary embodiment may further include that the first bracket comprises: a first end fixedly engaged with the first linkage arm at the first position; a second end opposite to the first end and fixedly engaged with the second linkage arm at the first position; and a first mount positioned between the first end of the first bracket and the second end of the first bracket. This exemplary embodiment or another exemplary embodiment may further include that the second bracket comprises: a first end of the second bracket fixedly engaged with the first linkage arm at the second position; a second end of the second bracket opposite to the first end of the second bracket and fixedly engaged with the second linkage arm at the second position; and a second mount positioned between the first end of the second bracket and the second end of the second bracket. This exemplary embodiment or another exemplary embodiment may further comprise a first extension of the first mount positioned between the first end of the first bracket and the second end of the first bracket; a second extension of the first mount positioned between the first end of the first bracket and the second end of the first bracket; and a first distance defined between the first extension of the first mount and the second extension of the first mount. This exemplary embodiment or another exemplary embodiment may further comprise a first extension of the second mount positioned between the first end of the second bracket and the second end of the second bracket; a second extension of the second mount positioned between the first end of the second bracket and the second end of the second bracket; and a second distance defined between the first extension of the second mount and the second extension of the second mount; wherein the second distance is greater than the first distance. This exemplary embodiment or another exemplary embodiment may further comprise a first inner surface of the first linkage arm extending between the first end of the first linkage arm and the second end of the first linkage arm and facing in a first direction; and a first outer surface of the first linkage arm extending between the first end of the first linkage arm and the second end of the first linkage arm and facing in a second direction opposite to the first direction; wherein the first mount operably engages with the first inner surface. This exemplary embodiment or another exemplary embodiment may further comprise a second inner surface of the second linkage arm extending between the first end of the second linkage arm and the second end of the second linkage arm and facing in a third direction; and a second outer surface of the second linkage arm extending between the first end of the second linkage arm and the second end of the second linkage arm and facing in a fourth direction opposite to the third direction; wherein the second mount operably engages with the second inner surface directly faces the first mount. This exemplary embodiment or another exemplary embodiment may further include that the first linkage arm comprises: a first opening defined at a first end of the first linkage arm; and a second opening defined at a second end of the first linkage arm opposite to the first end of the first linkage arm. This exemplary embodiment or another exemplary embodiment may further include that the second linkage arm comprises: a first opening defined at a first end of the second linkage arm; and a second opening defined at a second end of the first linkage arm opposite to the first end of the second linkage arm. This exemplary embodiment or another exemplary embodiment may further comprise a first pair of outer bushings operably engaged with the first linkage arm inside of the first opening of the first linkage arm and the second opening of the first linkage arm; wherein each outer bushing of the first pair of outer bushings defines a first material. This exemplary embodiment or another exemplary embodiment may further comprise a first pair of attachment assemblies operably engaging the first linkage arm with a mounting plate of the row unit and a head frame of the row unit; each attachment assembly of the first pair of attachment assemblies comprises: a connector; a washer operably engaged with the connector and defining a second material; and an inner bushing operably engaged with the connector and defining a third material; wherein the first material is harder than the second material and the third material. This exemplary embodiment or another exemplary embodiment may further comprise a second pair of outer bushings operably engaged with the second linkage arm inside of the first opening of the second linkage arm and the second opening of the second linkage arm; wherein each outer bushing of the second pair of outer bushings defines a fourth material. This exemplary embodiment or another exemplary embodiment may further comprise: a second pair of attachment assemblies operably engaging the second linkage arm with the mounting plate of the row unit and the head frame of the row unit; each attachment assembly of the second pair of attachment assemblies comprises: a connector; a washer operably engaged with the connector and defining a fifth material; and an inner bushing operably engaged with the connector and defining a sixth material; wherein the fourth material is harder than the fifth material and the sixth material.

In another aspect, and exemplary embodiment of the present disclosure may provide a method. The method comprises steps of: introducing a lower planting arm vertically below a set of upper planting arms of a row unit; aligning at least one opening defined in the lower planting arm with at least one aperture defined in a mounting plate of the row unit; aligning at least another opening defined in the lower planting arm with at least one through-hole defined in a head frame of the row unit; pivotally engaging the lower planting arm and the mounting plate with one another, via at least one attachment assembly, via the at least one opening and the at least one aperture; pivotally engaging the lower planting arm and the head frame with one another, via at least another attachment assembly, via the at least another opening and the at least one through-hole; and selectively engaging an actuating device with the lower planting arm via one of a first mount of a first bracket of the lower planting arm and a second mount of a second bracket of the lower planting arm.

This exemplary embodiment or another exemplary embodiment may further comprise steps of positioning a piston rod of the actuating device between a first extension of the first mount and a second extension of the first mount; introducing a retaining pin of the actuating device to a first hole defined in the first extension; introducing the retaining pin of the actuating device to a second hole defined in the second extension; and securing the piston rod with the first extension and the second extension via the retaining pin. This exemplary embodiment or another exemplary embodiment may further comprise steps of engaging a first end of the first bracket with a first linkage arm of the lower planting arm at a first position; engaging a second end of the first bracket with a second linkage arm of the lower planting arm at a second position; engaging a first end of the second bracket with the first linkage arm of the lower planting arm at a third position; and engaging a second end of the second bracket with the second linkage arm of the lower planting arm at a fourth position; wherein the first bracket, the second bracket, the first linkage arm, and the second linkage arm collectively define a single, monolithic member. This exemplary embodiment or another exemplary embodiment may further comprise steps of engaging at least one outer bushing with a first material inside of the at least one opening of the lower planting arm; engaging at least one washer of the at least one attachment assembly having a second material with at least one connector of the at least one attachment assembly; engaging at least one inner bushing of the at least one attachment assembly having a third material with the at least one connector; and engaging the at least one inner bushing with the at least one outer bushing; wherein the first material is harder than the second material and the third material. This exemplary embodiment or another exemplary embodiment may further comprise steps of engaging at least another outer bushing with a fourth material inside of the at least another opening of the lower planting arm; engaging at least another washer of the at least another attachment assembly having a fifth material with at least another connector of the at least another attachment assembly; engaging at least another inner bushing of the at least another attachment assembly having a sixth material with the at least one connector; and engaging the at least another inner bushing with the at least another outer bushing; wherein the fourth material is harder than the fifth material and the sixth material.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
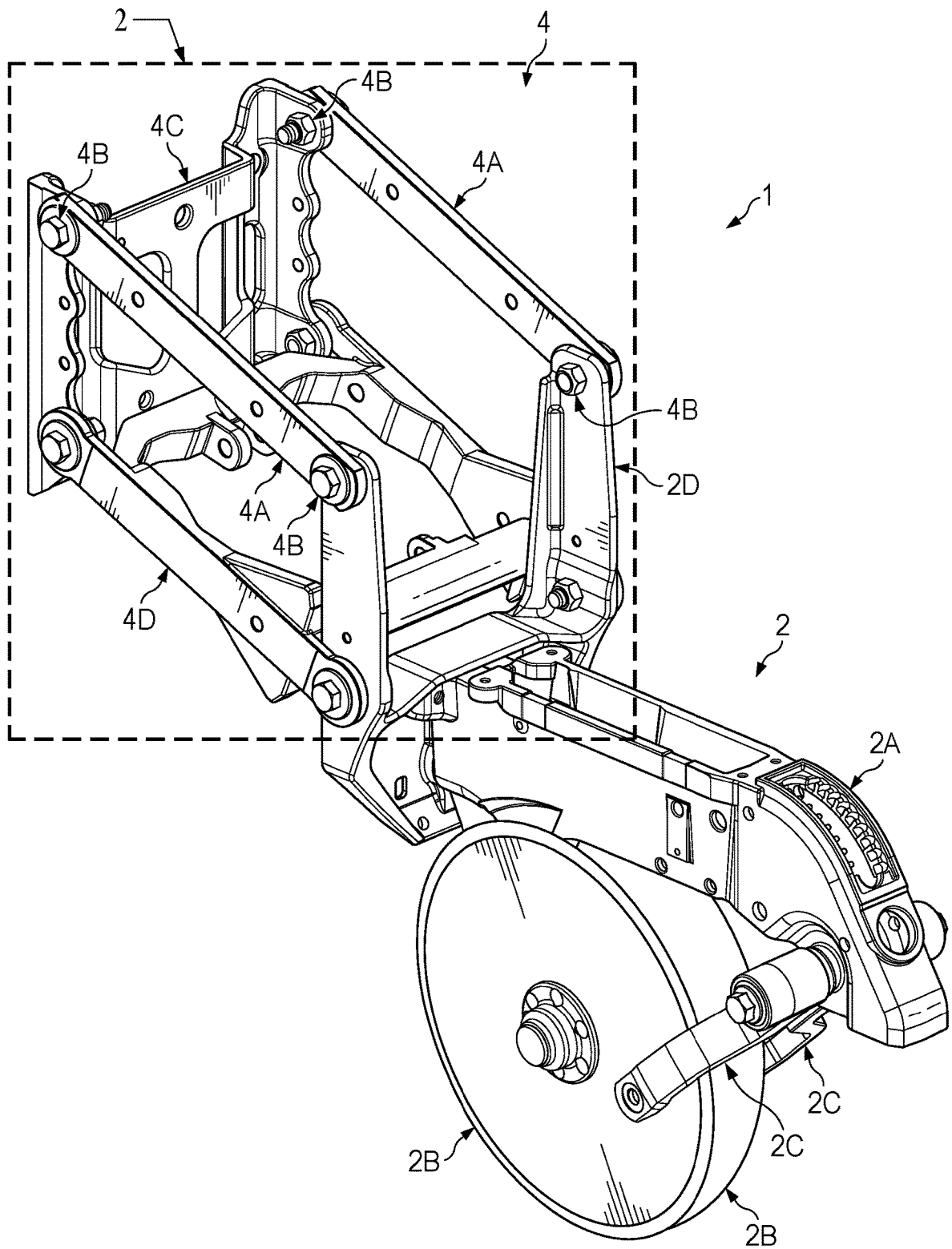
FIG. 1 is a rear, top, left side isometric perspective view of a row unit, wherein the row unit includes a lower planting arm assembly in accordance with an aspect of the present disclosure.

FIG. 1 illustrates a row unit or farming component, generally referred to as 1, that is configured to sow and plant a predetermined amount of seeds into a ground surface. It should be understood that the row unit 1 described and illustrated may be any commercially available row unit or farming component that is configured to sow and plant a predetermined amount of seeds into a ground surface. It should also be understood that the row unit 1 described and illustrated may be any commercially available row unit or farming component that is configured to receive and use a lower planting arm described and illustrated herein, which is described in more detail below.

The row unit 1 is configured to operably engage with a planter or farming implement (not illustrated) for planting desirable seeds into a ground surface. The row unit described and illustrated herein may be any suitable row unit that is configured to operably engage with a suitable planter for planting desirable seeds into a ground surface. In one exemplary embodiment, a row unit described and illustrated herein may be operably engaged with a drawn planter for planting desirable seeds into a ground surface. In another exemplary embodiment, a row unit described and illustrated herein may be operably engaged with a mounted planter for planting desirable seeds into a ground surface. In another exemplary embodiment, a row unit described and illustrated herein may be operably engaged with a compact planter for planting desirable seeds into a ground surface.

Row unit 1 may include a unit shank that is generally referred to as 2 in FIG. 1. As best seen in FIG. 1, the unit shank 2 may include a lower shank 2A that is configured to hold and maintain planting components of the unit shank 2 and other planting components of the row unit 1. The unit shank 2 may also include a set of closing wheels 2B that operably engages with the lower shank 2A via a set of gauge wheel arms 2C for closing seed trenches created by farming components (not illustrated herein) provided on the row unit 1. It should be understood that a row unit described and illustrated herein may include any suitable lower shank, closing wheels, and gauge wheel arms that are commercially available for farming and planting needs.

Figure 2:
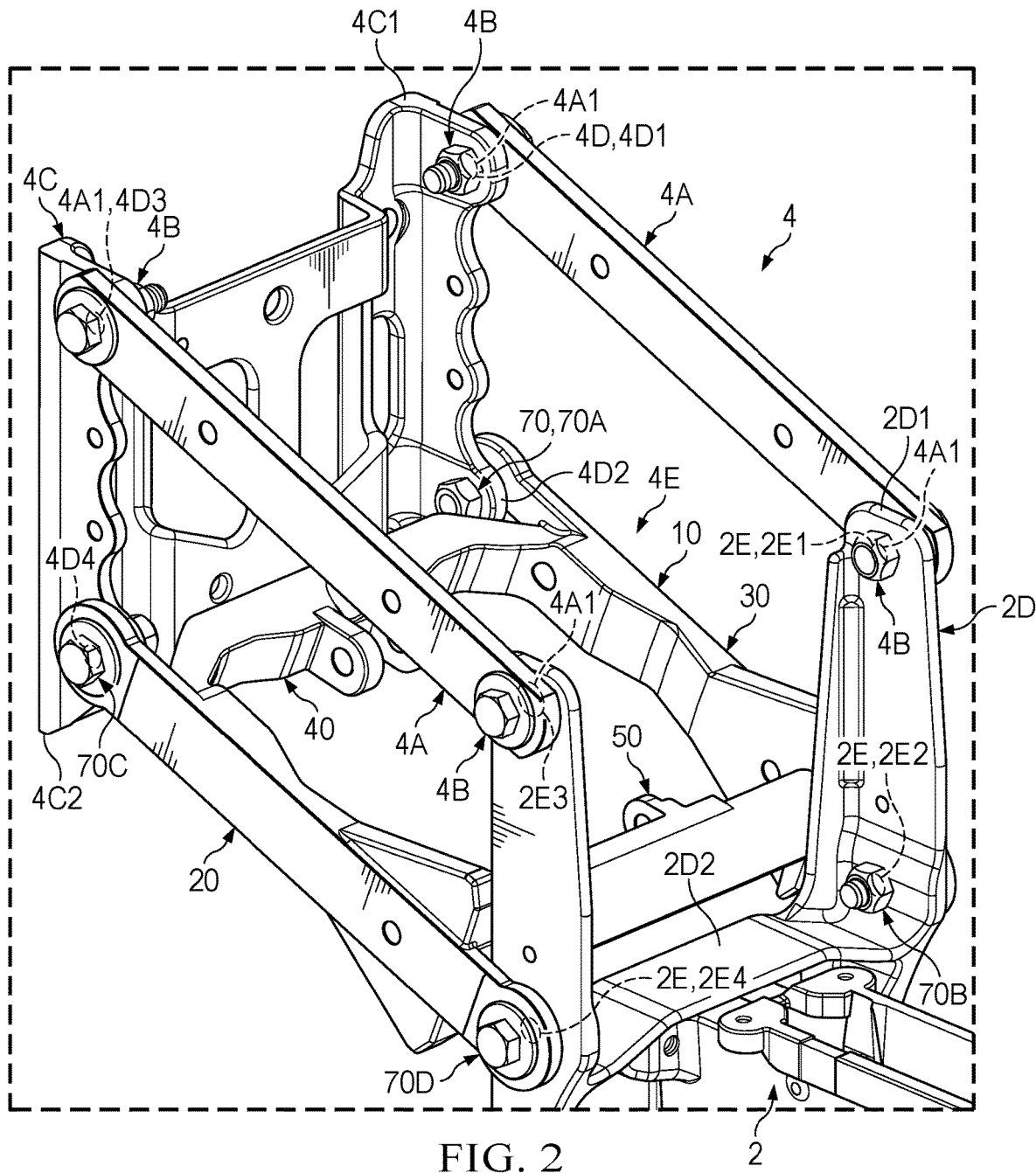
FIG. 2 is an enlargement of the highlighted region shown in FIG. 1.

Still referring to FIG. 1, the unit shank 2 may also include a head frame 2D that operably engages with the lower shank 2A longitudinally opposite to and vertically above the closing wheels 2B and the gauge wheel arms 2C. The head frame 2D may have a first or top end 2D1 positioned vertically above and remote from the lower shank 2A, a second or bottom end 2D2 operably engaged with the lower shank 2A and positioned vertically opposite to the top end 2D1, and a set of openings 2E defined in the head frame 2D at locations between the top end 2D1 and the bottom end 2D2. As best seen in FIG. 2, a first opening 2E1 of the set of openings 2E is defined at the top end 2D1 of the head frame 2D, a second opening 2E2 of the set of openings 2E defined at the bottom end 2D2 of the set of openings 2E vertically below the first opening 2E1, a third opening 2E3 of the set of openings 2E defined at the top end 2D1 of the set of openings 2E and coaxially aligned with the first opening 2E1, and a fourth opening 2E4 of the set of openings 2E defined at the bottom end 2D2 of the set of openings 2E and coaxially aligned with the second opening 2E2. As described in more detail below, the head frame 2D is configured to operably engage with a parallel linkage assembly of the row unit 1. It should be understood that a row unit described and illustrated herein may include any suitable head frame that is commercially available for farming and planting needs.

Row unit 1 may also include a parallel linkage assembly 4 that operably engages with the unit shank 2. While not illustrated herein, the parallel linkage assembly 4 may also operably engage with a planter or farming implement to operably the row unit 1 with the planter. The parallel linkage assembly 4 may include a pair of upper planting arms 4A that operably engages with the head frame 2D. More particularly, the pair of upper planting arms 4A operably engages with the top end 2D1 of the head frame 2D. As best seen in FIG. 2, each upper planting arm of the pair of upper planting arms 4A also defines a set of openings 4A1 that enables a set of connecting assemblies 4B to pivotally engage the pair of upper planting arms 4A with the head frame 2D via the first and third openings 2E1, 2E3 defined in the head frame 2D and the set of openings 4A1 defined in each upper planting arm of the pair of upper planting arms 4A. It should be understood that the pair of upper planting arms 4A described and illustrated herein may be any suitable and conventionally available upper planting arms configured to operably engage with a head frame and a mounting plate of a parallel linkage assembly, which is described in more detail below.

The parallel linkage assembly 4 may include a mounting plate 4C that operably engages with the pair of upper planting arms 4A and is remote from the head frame 2D. The mounting plate 4C may have a first or top end 4C1 positioned adjacent to the pair of upper planting arms 4A upon assembly of row unit 1. The mounting plate 4C may also have a second or bottom end 4C2 positioned vertically opposite to the top end 4C1 and operably engages with a lower planting arm of the parallel linkage assembly, which is described in more detail below. It should be understood that a row unit described and illustrated herein may include any suitable mounting frame that is commercially available for farming and planting needs.

The mounting plate 4C also defines a set of openings 4D defined in the mounting plate 4C at locations between the top end 4C1 and the bottom end 4C2. As best seen in FIG. 2, a first opening 4D1 of the set of openings 4D is defined at the top end 4C1 of the mounting plate 4C, a second opening 4D2 of the set of openings 4D defined at the bottom end 4C2 of the mounting plate 4C and vertically below the second opening 4D2, a third opening 4D3 of the set of openings 4D defined at the top end 4C1 of the mounting plate 4C and coaxially aligned with the first opening 4D1, and a fourth opening 4D4 of the set of openings 4D defined at the bottom end 4C2 of the mounting plate 4C and coaxially aligned with the second opening 4D2. As best seen in FIG. 2, connecting assemblies of the set of connecting assemblies 4B also pivotally engage the pair of upper planting arms 4A with the mounting plate 4C via the first and third openings 4D1, 4D3 defined in the mounting plate 4C and the set of openings 4A1 of each upper planting arm of the pair of upper planting arms 4A.

Referring to FIG. 2, the parallel linkage assembly 4 may also include a lower planting arm assembly, which is generally referred to as 4E, that operably engages with the head frame 2D and the mounting plate 4C. More particularly, the lower planting arm assembly 4E pivotally engages with the head frame 2D and the mounting plate 4C; such pivoting engagement of the lower planting arm assembly 4E with the head frame 2D and the mounting plate 4C is described in more detail below. Upon assembly of the row unit 1, the lower planting arm assembly 4E is also positioned vertically below the pair of upper planting arms 4A. During farming operations, the lower planting arm assembly 4E remains parallel with the pair of upper planting arms 4A as the lower planting arm assembly 4E and the pair of upper planting arms 4A pivot with the head frame 2D and the mounting plate 4C. Such components and parts that form the lower planting arm assembly 4E are described in more detail below.

The lower planting arm assembly 4E includes a lower planting arm 10. As described in more detail below, the lower planting arm 10 is configured to enable an operator of the row unit 1 to operably engaged an actuating device at a first position on the lower planting arm 10 and a separate farming component at a second position on the lower planting arm 10 (e.g, hoppers and other suitable farming components of the like). As also described in more detail below, the lower planting arm 10 also defines a substantially parallelogram shape based on the parts that make up the lower planting arm 10 in comparison to conventionally available lower planting arm.

The lower planting arm 10 may include a first linkage arm 20. As best seen FIG. 3, the first linkage arm 20 includes a first end 20A, a second end 20B longitudinally opposite to the first end 20A, and a longitudinal axis defined therebetween. The first linkage arm 20 also includes an inner side surface 20C extending between the first end 20A and the second end 20B, an outer side surface 20D extending between the first end 20A and the second end 20B and transversely opposite to the inner side surface 20C, and a transverse axis defined therebetween. The first linkage arm 20 may also include a top surface 20E vertically above the first end 20A, the second end 20B, the inner side surface 20C, and the outer side surface 20D, a bottom surface 20F vertically below the first end 20A, the second end 20B, the inner side surface 20C, and the outer side surface 20D and vertically opposite to the top surface 20E, and a vertical axis defined therebetween.

Figure 6:
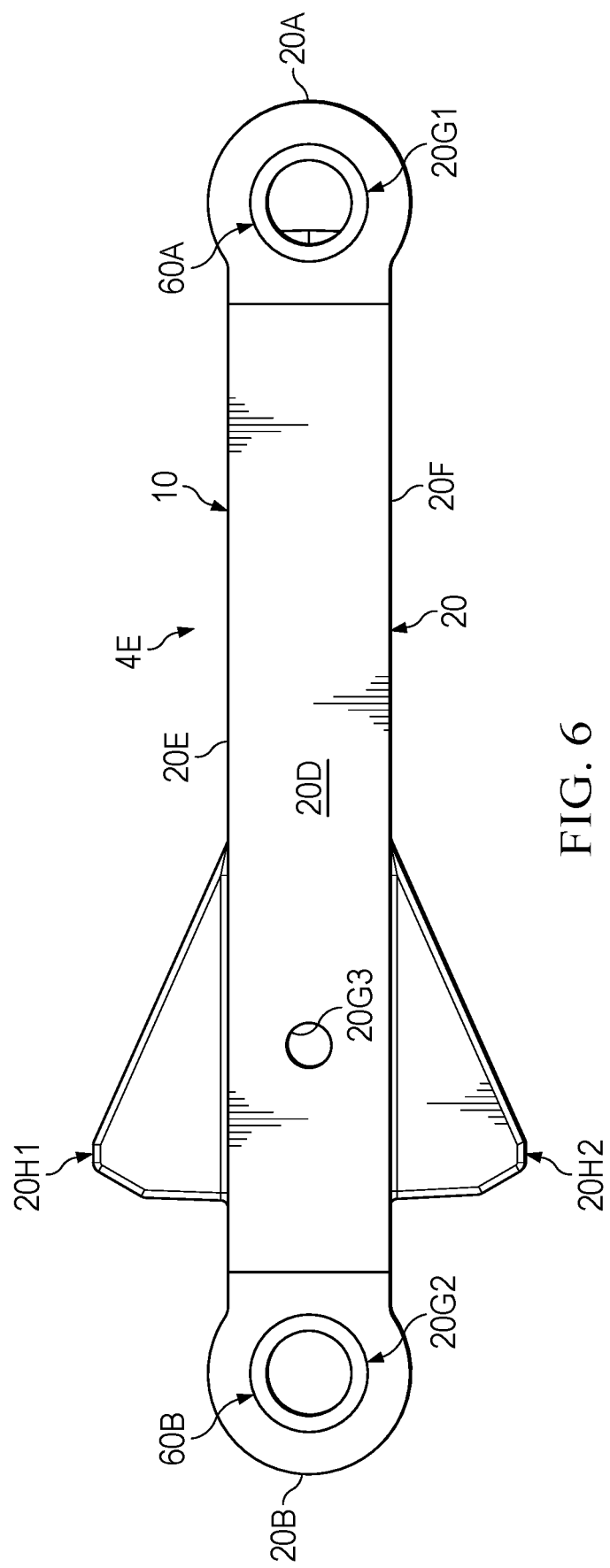
FIG. 6 is a right side elevation view of the lower planting arm of the lower planting arm assembly.

The first linkage arm 20 may also define at least one opening 20G at one or both of the first end 20A and the second end 20B. As best seen in FIG. 6, the first linkage arm 20 defines a first or front opening 20G1 at the first end 20A of the first linkage arm 20. The front opening 20G1 also extends entirely through the first linkage arm 20 from the inner side surface 20C to the outer side surface 20D such that the inner side surface 20C and the outer side surface 20D are in fluid communication with one another at the front opening 20G1. Similarly, the first linkage arm 20 defines a second or rear opening 20G2 at the second end 20B of the first linkage arm 20. The rear opening 20G2 also extends entirely through the first linkage arm 20 from the inner side surface 20C to the outer side surface 20D such that the inner side surface 20C and the outer side surface 20D are also in fluid communication with one another at the rear opening 20G2. Such use and purpose of the front opening 20G1 and the rear opening 20G2 is described in more detail below. The first linkage arm 20 may also define an intermediate opening 20G3 positioned between the first end 20A and the second end 20B of the first linkage arm 20. The intermediate opening 20G3 also extends entirely through the first linkage arm 20 from the inner side surface 20C to the outer side surface 20D such that the inner side surface 20C and the outer side surface 20D are also in fluid communication with one another at the intermediate opening 20G3.

The first linkage arm 20 may also include at least one wing 20H that is positioned on one or both of the top surface 20E and the bottom surface 20F of the first linkage arm 20. As best seen in FIG. 6, the first linkage arm 20 include a first wing 20H1 that is positioned on the top surface 20E of the first linkage arm 20 and extends vertically upward away from the top surface 20E. Similarly, the first linkage arm 20 include a second wing 20H2 that is positioned on the bottom surface 20F of the first linkage arm 20 and extends vertically downward away from the bottom surface 20F. The first wing 20H1 and the second wing 20H2 may be configured for general and/or conventional uses of a lower parallel arm of a row unit.

Figure 4:
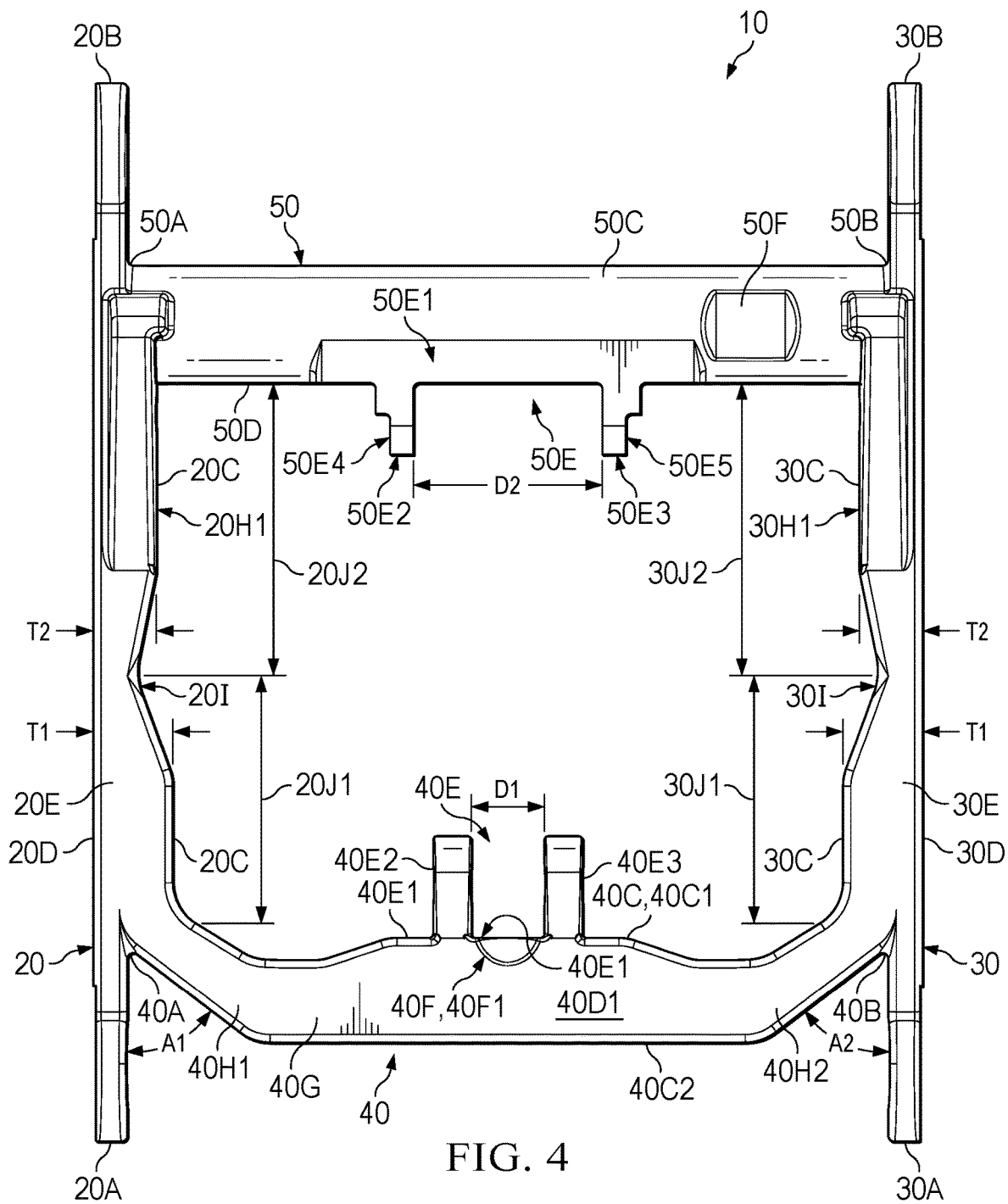
FIG. 4 is a top plan view of a lower planting arm of the lower planting arm assembly.

As best seen in FIG. 4, the first linkage arm 20 may also define a first notch 20I that extends transversely into the first linkage arm 20. More particularly, the first notch 20I extends transversely into the first linkage arm 20 from the inner side surface 20C towards the outer side surface 20D.

As best seen in FIG. 4, the first linkage arm 20 may also define varying thickness along the first linkage arm 20 between the first end 20A to the second end 20B. The first linkage arm 20 includes a first strengthening portion 20J1 that extends from the first notch 20I towards the first end 20A. The first strengthening portion 20J1 also defines a first thickness "T1" measured from the inner side surface 20C to the outer side surface 20D. The first linkage arm 20 also includes a second strengthening portion 20J2 that extends from the first notch 20I towards the second end 20B. The second strengthening portion 20J2 also defines a second thickness "T2" measured from the inner side surface 20C to the outer side surface 20D. As best seen in FIG. 4, the first thickness "T1" of the first strengthening portion 20J1 is greater than the second thickness "T2" of the second strengthening portion 20J2. Such use of the first strengthening portion 20J1 and the second strengthening portion 20J2 provides additional strength and support to the first linkage arm 20 as compared to lower parallel arms conventionally used in farming operations.

The lower planting arm 10 may also include a second linkage arm 30. It should be understood that the second linkage arm 30 is substantially similar to the first linkage arm 20 and is provided in a mirrored-image orientation relative to the first linkage arm 20. As such, the second linkage arm 30 includes a first end 30A, a second end 30B, an inner side surface 30C, an outer side surface 30D, a top surface 30E, and a bottom surface 30F that are substantially similar to the first end 20A, the second end 20B, the inner side surface 20C, the outer side surface 20D, the top surface 20E, and the bottom surface 20F of the first linkage arm 20. The second linkage arm 30 also defines a front opening 30G1, a rear opening 30G2, and a first intermediate opening 30G3 that are substantially similar to the front opening 20G1, the rear opening 20G2, and the intermediate opening 20G3 defined by the first linkage arm 20. The second linkage arm 30 also includes a first wing 30H1 and a second wing 30H2 that are substantially similar to the first wing 20H1 and the second wing 20H2 of the first linkage arm 20. The second linkage arm 30 also defines a second notch 30I that is substantially similar to the first notch 20I defined by the first linkage arm 20. The second linkage arm 30 also includes a first strengthening portion 30J1 defining a first thickness "T1" and a second strengthening portion 30J2 defining a second thickness "T2" that are substantially similar to the first strengthening portion 20J1 defining the first thickness "T1" and the second strengthening portion 20J2 defining the second thickness "T2" of the first linkage arm 20.

Figure 7:
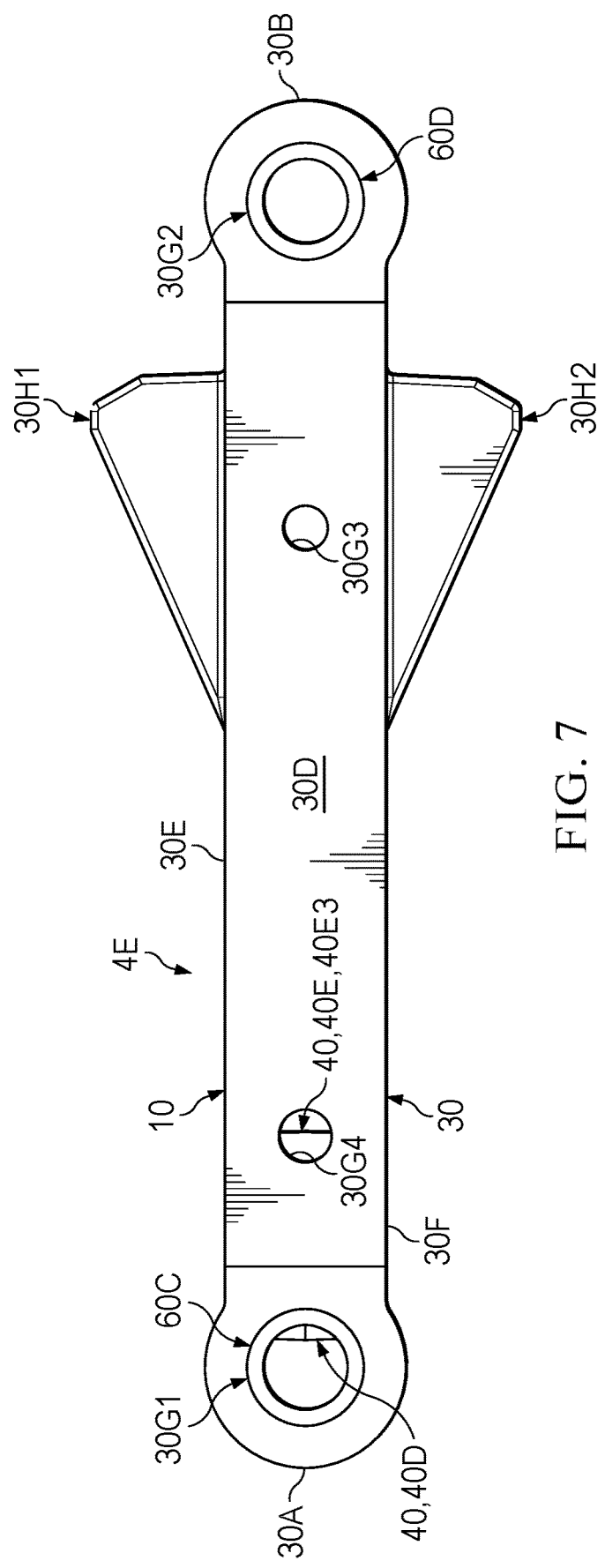
FIG. 7 is a left side elevation view of the lower planting arm of the lower planting arm assembly.

As best seen in FIG. 7, the second linkage arm 30 also defines a second intermediate opening 30G4 that is located between the front opening 30G1 and the first intermediate opening 30G3. The second intermediate opening 30G4 also extends entirely through the second linkage arm 30 from the inner side surface 30C to the outer side surface 30D such that the inner side surface 30C and the outer side surface 30D are in fluid communication with one another via the second intermediate opening 30G4.

The lower planting arm 10 may also include a first bracket 40 that operably engages with the first linkage arm 20 and the second linkage arm 30 at a first position with each of the first linkage arm 20 and the second linkage arm 30. As best seen in FIG. 4, the first bracket 40 includes a first end 40A that operably engages with the first linkage arm 20, a second end 40B longitudinal opposite to the first end 40A and operably engages with the second linkage arm 30, and a longitudinal axis defined therebetween. More particularly, the first end 40A operably engages with the inner side surface 20C of the first linkage arm 20 at the first end 20A of the first linkage arm 20, and the second end 40B operably engages with the inner side surface 30C of the second linkage arm 30 at the first end 30A of the second linkage arm 30. The first bracket 40 also includes a pair of side walls 40C that extends between the first end 40A and the second end 40B of the first bracket 40. Specifically, the first bracket 40 includes an inner side wall 40C1 that extends between the first end 40A and the second end 40B of the first bracket 40 and faces in a direction towards the second ends 20B, 30B of the first linkage arm 20 and the second linkage arm 30, an outer side wall 40C2 that extends between the first end 40A and the second end 40B of the first bracket 40 and faces in a direction towards the first ends 20A, 30A of the first linkage arm 20 and the second linkage arm 30, and a transverse axis defined therebetween. The first bracket 40 also includes a top surface 40D1 that is positioned vertically above each of the first end 40A, the second end 40B, the inner side wall 40C, and the outer side wall 40D, a bottom surface 40D2 that is positioned vertically below each of the first end 40A, the second end 40B, the inner side wall 40C, and the outer side wall 40D and vertically opposite to the top surface 40D1, and a vertical axis defined therebetween.

Figure 5:
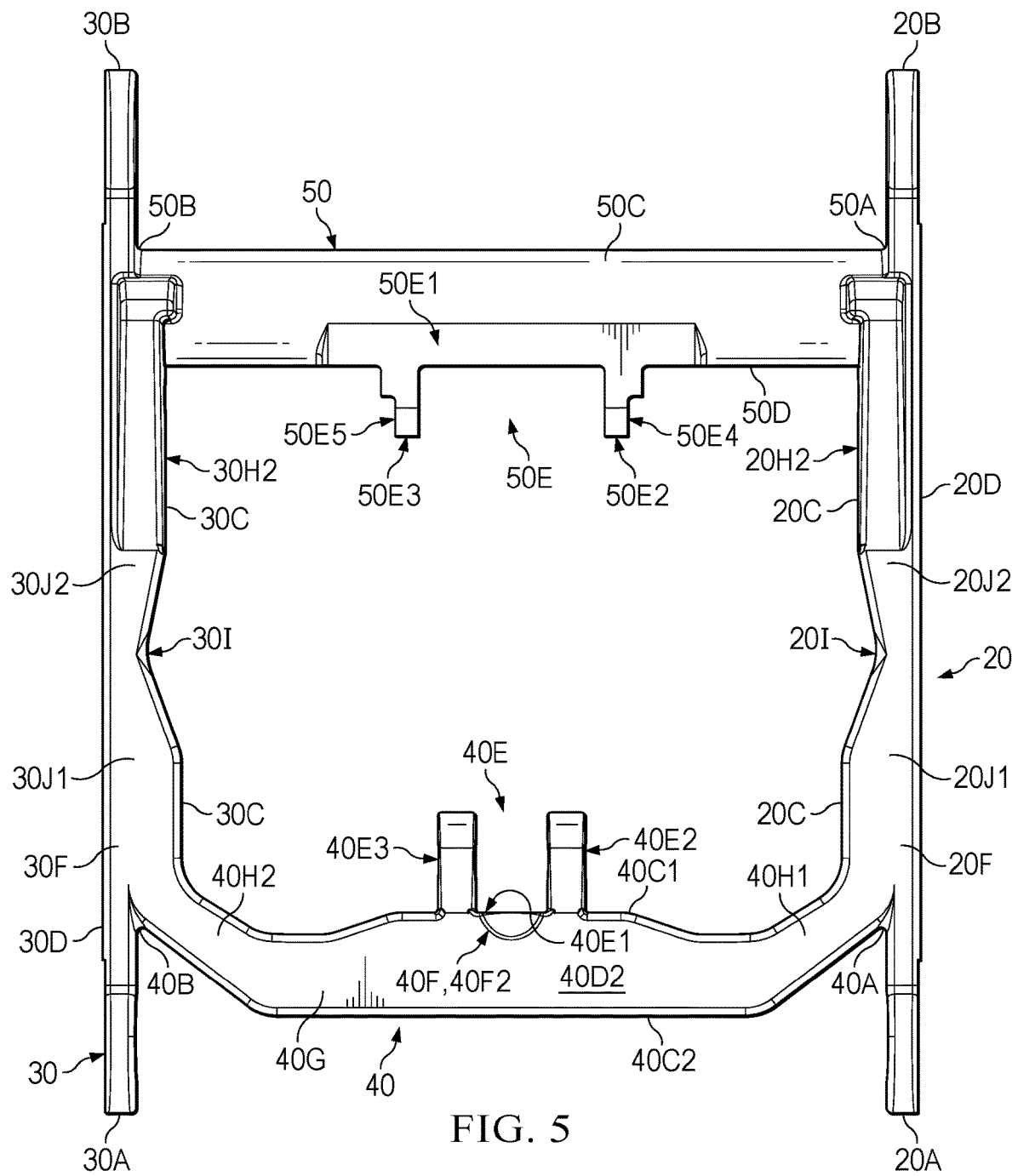
FIG. 5 is a bottom plan view of the lower planting arm of the lower planting arm assembly.

As best seen in FIGS. 4 and 5, the first bracket 40 also includes a first actuator mount 40E that operably engages with one of the inner side wall 40C1 and the outer side wall 40C2. More particularly, the first actuator mount 40E operably engages with the inner side wall 40C1 and is positioned at a location between the first end 40A and the second end 40B. The first actuator mount 40E includes a base 40E1 that extends outwardly from the inner side wall 40C1 and towards the second ends 20B, 30B of the first linkage arm 20 and the second linkage arm 30. The base 40E1 is also positioned at a location between the first end 40A and the second end 40B of the first bracket 40.

Still referring to FIGS. 4 and 5, the first actuator mount 40E also includes a first extension 40E2 that extends from the base 40E1 and towards the second ends 20B, 30B of the first linkage arm 20 and the second linkage arm 30. The first actuator mount 40E also includes a second extension 40E3 that extends from the base 40E1 and towards the second ends 20B, 30B of the first linkage arm 20 and the second linkage arm 30. The second extension 40E3 is also positioned longitudinally adjacent to the first extension 40E2 along an axis that is parallel with the longitudinal axis of the first bracket 40. As best seen in FIG. 4, a first distance "D1" is measured between the first extension 50E2 and the second extension 50E3 for receiving suitable and commercially available actuators or similar devices of the like upon assembly of the row unit 1; such engagement of actuators or similar devices of the like with the first actuator mount 40E is described in more detail below.

Figure 3:
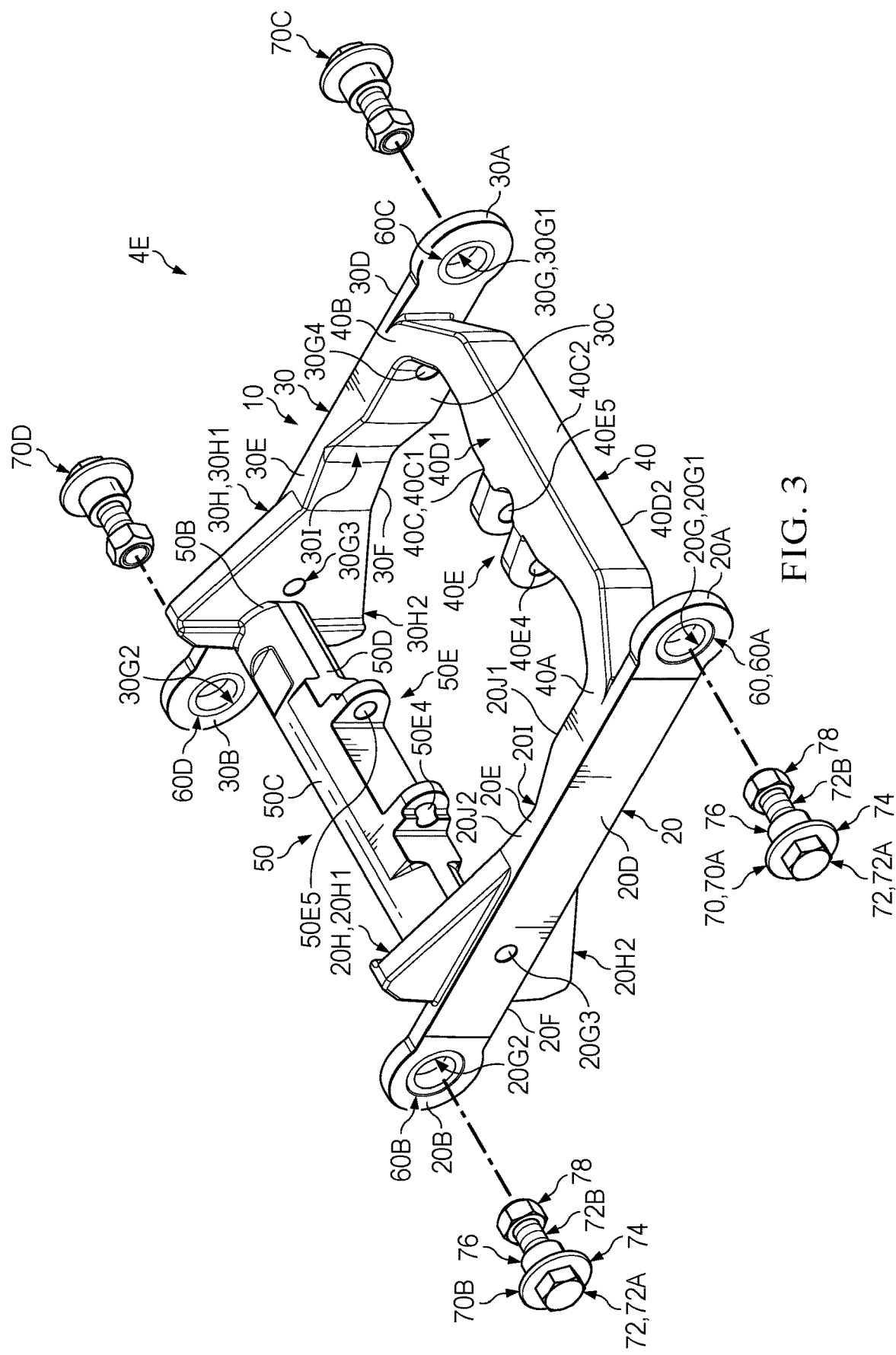
FIG. 3 is an exploded view of the lower planting arm assembly.

As best seen in FIG. 3, a first hole 40E4 is defined in the first extension 40E2 in which the first hole 40E4 extends entirely through the first extension 40E2 along an axis that is parallel with the longitudinal axis of the first bracket 40. Still referring to FIG. 3, a second hole 40E5 is defined in the second extension 40E3 in which the second hole 40E5 extends entirely through the second extension 40E3 along an axis that is parallel with the longitudinal axis of the first bracket 40. The first hole 40E4 and the second hole 40E5 are also coaxially with one another and are configured to receive a locking member or pin to operably engage an actuator or similar device of the like with the first extension 40E2 and the second extension 40E3.

As best seen in FIG. 4, the first bracket 40 also defines at least one cavity 40F that extends into the first bracket 40. As best seen in FIG. 4, a first cavity 40F1 extends downwardly into the top surface 40D1 and terminates in the inner side wall 40C1. As best seen in FIG. 5, a second cavity 40F2 extends upwardly into the bottom surface 40D2 and terminates in the inner side wall 40C1. The first cavity 40F1 and the second cavity 40F2 may also be defined at a location between the first end 40A and the second end 40B of the first bracket 40. In the illustrated embodiment, each of the first cavity 40F1 and the second cavity 40F2 is defined between the first extension 40E2 and the second extension 40E3 of the first actuator mount 40E.

As best seen in FIG. 4, the first bracket 40 may also include a main portion 40G that includes at least one leg 40H extending from the main portion 40G to one or both of the first linkage arm 20 and the second linkage arm 30. As best seen in FIG. 4, the first bracket 40 includes a first leg 40H1 that extends rearwardly from the main portion 40G to the first linkage arm 20. The first leg 40H1 operably engages with the inner side surface 20C of the first linkage arm 20 at a position between the first end 20A of the first linkage arm 20 and the first notch 20I defined in the first linkage arm 20. The first leg 40H1 is also positioned at a first angle "A1" measured between the inner side surface 20C of the first linkage arm 20 and the outer side wall 40C2 of the first bracket 40 relative to the main portion 40G. Similarly, the first bracket 40 includes a second leg 40H2 that extends rearwardly from the main portion 40G to the second linkage arm 30. The second leg 40H2 operably engages with the inner side surface 30C of the second linkage arm 30 at a position between the first end 30A of the second linkage arm 30 and the second notch 30I defined in the second linkage arm 30. The second leg 40H2 is also positioned at a second angle "A2" measured between the inner side surface 30C of the second linkage arm 30 and the outer side wall 40C2 of the first bracket 40 relative to the main portion 40G. In the illustrated embodiment, the first angle "A1" of the first leg 40H1 and the second angle "A2" of the second leg 40H2 are congruent angles to one another. As best seen in FIG. 4, the main portion 40G is also positioned forward of the first leg 40H1 and the second leg 40H2 such that the main portion 40G is offset from the first leg 40H1 and the second leg 40H2. The main portion 40G along with the first leg 40H1 and the second leg 40H2 are also positioned rearwardly of the first ends 20A, 30A of the first linkage arm 20 and the second linkage arm 30.

The lower planting arm 10 may also include a second bracket 50 that operably engages with the first linkage arm 20 and the second linkage arm 30 at a second position and is positioned longitudinally opposite to the first bracket 40. As best seen in FIG. 4, the second bracket 50 includes a first end 50A that is operably engages with the first linkage arm 20, a second end 50B longitudinal opposite to the first end 50A and operably engages with the second linkage arm 30, and a longitudinal axis defined therebetween. More particularly, the first end 50A operably engages with the inner side surface 20C of the first linkage arm 20 at the second end 20B of the first linkage arm 20, and the second end 50B operably engages with the inner side surface 30C of the second linkage arm 30 at the second end 30B of the second linkage arm 30. The second bracket 50 also includes a circumferential wall 50C that extends longitudinally between the first end 50A and the second end 50B. As best seen in FIG. 3, the second bracket 50 also includes a planar or flat surface 50D that extends from the circumferential wall 50C. The planar surface 50D faces in a direction towards the first ends 20A, 30A of the first linkage arm 20 and the second linkage arm 30 and away from the second ends 20B, 30B of the first linkage arm 20 and the second linkage arm 30.

As best seen in FIGS. 4 and 5, the second bracket 50 also includes a second actuator mount 50E. More particularly, the second actuator mount 50E operably engages with the circumferential wall 50C and the planar surface 50D and is positioned at a location between the first end 50A and the second end 50B. The second actuator mount 50E includes a base 50E1 that extends from the circumferential wall 50C and towards the first ends 20A, 30A of the first linkage arm 20 and the second linkage arm 30 and is positioned at a location between the first end 50A and the second end 50B. The second actuator mount 50E also includes a first extension 50E2 that extends forwardly from the base 50E1 and towards the first ends 20A, 30A of the first linkage arm 20 and the second linkage arm 30. The second actuator mount 50E also includes a second extension 50E3 that extends forwardly from the base 50E1 and towards the first ends 20A, 30A of the first linkage arm 20 and the second linkage arm 30. The second extension 50E3 is also positioned longitudinally adjacent to the first extension 50E2 along an axis that is parallel with the longitudinal axis of the second bracket 50. As best seen in FIG. 4, a second distance "D2" is measured between the first extension 50E2 and the second extension 50E3. In the illustrated embodiment, the second distance "D2" measured between the first extension 50E2 and the second extension 50E3 of the second actuator mount 50E is greater than the first distance "D1" measured between the first extension 40E2 and the second extension 40E3 of the first actuator mount 40E.

As best seen in FIG. 3, a first hole 50E4 is defined in the first extension 50E2 in which the first hole 50E4 extends entirely through the first extension 50E2 along an axis that is parallel with the longitudinal axis of the second bracket 50. Still referring to FIG. 3, a second hole 50E5 is defined in the second extension 50E3 in which the second hole 50E5 extends entirely through the second extension 50E3 along an axis that is parallel with the longitudinal axis of the second bracket 50. The first hole 50E4 and the second hole 50E5 are also coaxially with one another. Such inclusion of the first hole 50E4 and the second hole 50E5 may be utilized for attaching a locking member or pin to operably engage a farming component with the first extension 50E2 and the second extension 50E3.

As best seen in FIG. 4, the second bracket 50 also defines an indentation 50F that extends downwardly into the circumferential wall 50C of the second bracket 50. The indentation 50F may also be defined at a location between the first end 50A and the second end 50B of the second bracket 50 proximate to the second end 50B of the second bracket 50. As best seen in FIG. 4, the indentation 50F is defined between the second end 50B of the second bracket 50 and the second extension 50E3.

In the illustrated embodiment, the first linkage arm 20, the second linkage arm 30, the first bracket 40, and the second bracket 50 collectively define a single, monolithic lower parallel arm 10 in which the first linkage arm 20, the second linkage arm 30, the first bracket 40, and the second bracket 50 are fixedly engaged with one another. The first linkage arm 20, the second linkage arm 30, the first bracket 40, and the second bracket 50 may also collectively define a parallelogram shape for the lower parallel arm 10. In other exemplary embodiment, a first linkage arm, a second linkage arm, a first bracket, and a second bracket of a lower planting arm assembly described and illustrated herein may be operably engaged with one another in any suitable configuration. In one example, a first linkage arm, a second linkage arm, a first bracket, and a second bracket may collectively define a single, monolithic member in which the first linkage arm, the second linkage arm, the first bracket, and the second bracket are releasably attached or secured with one another.

The lower planting arm assembly 4E may also include at least one outer bushing 60 that operably engages with one or both of the first linkage arm 20 and the second linkage arm 30 via the at least one opening 20G and the at least one opening 30G. As best seen in FIG. 3, a first outer bushing 60A operably engages with the first linkage arm 20 via the front opening 20G1 defined at the first end 20A of the first linkage arm 20, and a second outer bushing 60B operably engages with the first linkage arm 20 via the rear opening 20G2 defined at the second end 20B of the first linkage arm 20. Similarly, a third outer bushing 60C operably engages with the second linkage arm 30 via the front opening 30G1 defined at the first end 30A of the second linkage arm 30, and a fourth outer bushing 60D operably engages with the second linkage arm 30 via the rear opening 30G2 defined at the second end 30B of the second linkage arm 30. Each of the first outer bushing 60A, the second outer bushing 60B, the third outer bushing 60C, and the fourth outer bushing 60D is made from a first material having a first hardness. Such use and purpose of each of the first outer bushing 60A, the second outer bushing 60B, the third outer bushing 60C, and the fourth outer bushing 60D is described in more detail below.

The lower planting arm assembly 4E also includes at least one attachment assembly 70 that operably engages the lower planting arm 10 with the head frame 2D of the unit shank 2 and the mounting plate 4C of the parallel linkage assembly 4. As described in more detail below, the at least one attachment assembly 70 is configured to pivotally engaged the lower planting arm 10 with the head frame 2D and the mounting plate 4C. In the illustrated embodiment, the lower planting arm assembly 4E includes a four attachment assemblies 70 that pivotally engaged the lower planting arm 10 with the head frame 2D and the mounting plate 4C. As best seen in FIG. 2, a first attachment assembly 70A operably engages the first end 20A of the first linkage arm 20 with the mounting plate 4C, a second attachment assembly 70B operably engages the second 20B of the first linkage arm 20 with the head frame 2D, a third attachment assembly 70C operably engages the first end 30A of the second linkage arm 30 with the mounting plate 4C, a fourth attachment assembly 70D operably engages the second end 30B of the second linkage arm 30 with the head frame 2D. The parts and components that form each attachment assembly 70 is described in further detail below.

As best seen in FIG. 3, each attachment assembly 70 includes a connector 72. The connector 72 includes a head 72A and a threaded shaft 72B that extends longitudinally away from the head 72A. The connector 72 is configured to connect and/or link the lower planting arm 10 with one of the head frame 2D and the mounting frame 4C. As illustrated in FIG. 2, the connector 72 of the first attachment assembly 70A passes through the second opening 4D2 of the mounting frame 4C and the front opening 20G1 of the first linkage arm 20 to operably engage the mounting plate 4C and the first linkage arm 20 with one another. The connector 72 of the second attachment assembly 70B also passes through the second opening 2E2 of the head frame 2D and the rear opening 20G2 of the first linkage arm 20 to operably engage the head frame 2D and the first linkage arm 20 with one another. The connector 72 of the third attachment assembly 70C passes through the fourth opening 4D4 of the mounting plate 4C and the front opening 30G1 of the second linkage arm 30 to operably engage the mounting plate 4C and the second linkage arm 30 with one another. The connector 72 of the fourth attachment assembly 70D also passes through the fourth opening 2E4 of the head frame 2D and the rear opening 30G2 of the second linkage arm 30 to operably engage the head frame 2D and the second linkage arm 30 with one another.

Each attachment assembly 70 also includes a washer 74 that operably engages with the connector 72 of each attachment assembly 70. As best seen in FIGS. 2 and 3, the washer 74 of the first attachment assembly 70A operably engages with the head 72A of the connector 72 and the outer side surface 20D of the first linkage arm 20 at the front opening 20G1 of the first linkage arm 20. The washer 74 of the second attachment assembly 70B operably engages with the head 72A of the connector 72 and the outer side surface 20D of the first linkage arm 20 at the rear opening 20G2 of the first linkage arm 20. The washer 74 of the third attachment assembly 70C operably engages with the head 72A of the connector 72 and the outer side surface 30D of the second linkage arm 30 at the front opening 30G1 of the second linkage arm 30. The washer 74 of the fourth attachment assembly 70D operably engages with the head 72A of the connector 72 and the outer side surface 30D of the second linkage arm 30 at the rear opening 30G2 of the second linkage arm 30. It should be understood that each washer of the first attachment assembly 70A, the second attachment assembly 70B, the third attachment assembly 70C, and the fourth attachment assembly 70D are made of a second material having a second hardness. In the illustrated embodiment, the second material of the washers 72 is softer than the first materials of the outer bushings 60.

Each attachment assembly 70 also includes an inner bushing 76 that that operably engages with an outer bushing 60 of the lower planting arm assembly 4E and the connector 72 of each attachment assembly 70. As best seen in FIGS. 2 and 3, the inner bushing 76 of the first attachment assembly 70A operably engages with the connector 72 of the first attachment assembly 70A and the first outer bushing 60A upon assembly of the lower planting arm assembly 4E with the head frame 2D and the mounting plate 4C. The inner bushing 76 is configured to be housed inside of the first outer bushing 60A once the first attachment assembly 70A operably engages the first linkage arm 20 with the mounting plate 4C. Similarly, the inner bushings 76 of the second attachment assembly 70B, the third attachment assembly 70C, and the fourth attachment assembly 70D operably engage with the connectors 72 of the second attachment assembly 70B, the third attachment assembly 70C, and the fourth attachment assembly 70D. The inner bushings 76 of the second attachment assembly 70B, the third attachment assembly 70C, and the fourth attachment assembly 70D also operably engage with the second outer bushing 60B, the third outer bushing 60C, and the fourth outer bushing 60D upon assembly of the lower planting arm assembly 4E with the head frame 2D and the mounting plate 4C. As such, the inner bushing 76 of the second attachment assembly 70B is configured to be housed inside of the second outer bushing 60B once the second attachment assembly 70B operably engages the first linkage arm 20 with the head frame 2D, the inner bushing 76 of the third attachment assembly 70C is configured to be housed inside of the third outer bushing 60C once the third attachment assembly 70C operably engages the second linkage arm 30 with the mounting plate 4C, and the inner bushing 76 of the fourth attachment assembly 70D is configured to be housed inside of the fourth outer bushing 60D once the fourth attachment assembly 70D operably engages the second linkage arm 30 with the head frame 2D.

The inner bushing 76 of each of the first attachment assembly 70A, the second attachment assembly 70B, the third attachment assembly 70C, and the fourth attachment assembly 70D is formed of a third material having a third hardness. In the illustrated embodiment, the first material of each outer bushing 60 is harder than the second material of each washer 74 and the third material of each inner bushing 76. Such differences in hardness between the outer bushing 60 and the inner bushing 76 creates a bearing mechanism between the outer bushing 60 and the inner bushing 76 as the lower parallel arm 10 pivots on the head frame 2D and the mounting frame 4C. The structural configuration between the outer bushings 60 and the inner bushings 76 enable the outer bushings 60 to deform and wear at lower rates as compared to the inner bushings 76 deforming and wearing at a quicker rate due to the softer material. With such configuration, an operator is enabled to simply remove any attachment assembly 70 from the lower parallel arm 10 for replacing a deformed or worn inner bushing 76 while the outer bushing 60 remains secured inside of the lower parallel arm 10. This quick disassembling and reassembling of worn bushings of the lower parallel arm assembly 4E reduces down time of a planter or row units during farming operations.

As best seen in FIG. 3, each attachment assembly 70 includes a nut 78 that is configured to threadably engage with the connector 72 of each attachment assembly 70. As illustrated in FIG. 2, the nut 78 of the first attachment assembly 70A threadably engages with the connector 72 of the first attachment assembly 70A to operably engage the mounting plate 4C and the first linkage arm 20 with one another. The nut 78 of the second attachment assembly 70B also threadably engages with the connector 72 of the second attachment assembly 70B to operably engage the head frame 2D and the first linkage arm 20 with one another. The nut 78 of the third attachment assembly 70C also threadably engages with the connector 72 of the third attachment assembly 70C to operably engage the mounting plate 4C and the second linkage arm 30 with one another. The nut 78 of the fourth attachment assembly 70D also threadably engages with the connector 72 of the fourth attachment assembly 70D to operably engage the head frame 2D and the second linkage arm 30 with one another.

Having now described the parts and components of the lower planting arm assembly 4E, operations of engaging the lower planting arm assembly 4E with the head frame 2D and the mounting plate 4C is described in more detail below.

As illustrated in FIG. 3, each outer bushing 60A, 60B, 60C, 60D may be introduced to and engaged with the lower planting arm 10 prior to assembling the lower planting arm assembly 4E with the head frame 2D and the mounting plate 4C. As described previously, each outer bushing 60A, 60B, 60C, 60D is designed to be engaged with one of the first linkage arm 20, via openings 20G1, 20G2, and the second linkage arm 30, via openings 30G1, 30G2. As such, the first outer bushing 60A is introduced to and operably engaged with the first linkage arm 20 via front opening 20G1, the second outer bushing 60B is introduced to and operably engaged with the first linkage arm 20 via the rear opening 20G2, the third outer bushing 60C is introduced to and operably engaged with the second linkage arm 30 via the front opening 30G1, and the fourth outer bushing 60D is introduced to and operably engaged with the second linkage arm 30 via the rear opening 30G2. Once the outer bushings 60A, 60B, 60C, 60D are operably engaged with the lower planting arm 10, the lower planting arm 10 may then be introduced to and aligned with the head frame 2D and the mounting plate 4C.

As illustrated in FIG. 2, the lower planting arm 10 may then be introduced to the head frame 2D and the mounting plate 4C. As shown in FIG. 2, the first linkage arm 20 and the second linkage arm 30 are positioned outside the head frame 2D and the mounting plate 4C such that the inner side surfaces 20C, 30C are interfacing with the head frame 2D and the mounting plate 4C. Once introduced, the front opening 20G1 of the first linkage arm 20 and the front opening 30G1 of the second linkage arm 30 may be aligned with the second opening 4D2 and the fourth opening 4D4 defined in the mounting plate 4C. Similarly, the rear opening 20G2 of the first linkage arm 20 and the rear opening 30G2 of the second linkage arm 30 may be aligned with the second opening 2E2 and the fourth opening 2E4 defined in the head frame 2D. Once aligned, the attachment assemblies 70A, 70B, 70C, 70D may be introduced and used to operably engage the lower planting arm 10 with the head frame 2D and the mounting plate 4C.

Prior to engaging the lower planting arm 10 with the head frame 2D and the mounting plate 4C, the washer 74 and the inner bushing 76 of each attachment assembly 70A, 70B, 70C, 70D is operably engaged with the respective connector 72 of each attachment assembly 70A, 70B, 70C, 70D (best seen in FIG. 3). Once engaged, the combination of the connector 72, washer 74, and inner bushing 76 of each attachment assembly 70A, 70B, 70C, 70D may then be used to operably engage the lower planting arm 10 with the head frame 2D and the mounting plate 4C. The combination of the connector 72, washer 74, and inner bushing 76 of the first attachment assembly 70A is fed into the front opening 20G1 of the first linkage arm 20 and the first outer bushing 60A until the connector 72 links the first linkage arm 20 and the mounting plate 2C with one another. Once the connector 72 links the first linkage arm 20 and the mounting plate 4C with one another, the inner bushing 76 of the first attachment assembly 70A operably engages inside of the first outer bearing 60A inside of the front opening 20G1 defined by the first linkage arm 20. Similarly, the combination of the connector 72, the washer 74, and the inner bushing 76 of each of the second attachment assemblies 70B is fed into the rear opening 20G2 of the first linkage arm 20 and the second outer bushing 60B until the connector 72 links the first linkage arm 20 and the head frame 2D with one another. Once the connector 72 links the first linkage arm 20 and the head frame 2D with one another, the inner bushing 76 of the second attachment assembly 70B operably engages inside of the second outer bearing 60B inside of the rear opening 20G2 defined by the first linkage arm 20. The same operation and engagement is used with the third attachment assembly 70C and the fourth attachment assembly 70D when engaging the second linkage arm 30 with the head frame 2D and the mounting plate 4C along with engaging the inner bushings 76 with the third outer bearing 60C and the fourth outer bearing 60D.

Once the attachment assemblies 70A, 70B, 70C, 70D operably engage the lower planting arm 10 with the head frame 2D and the mounting plate 4C, the nuts 78 of the attachment assemblies 70A, 70B, 70C, 70D are then threadably engaged with the connectors 72 of the attachment assemblies 70A, 70B, 70C, 70D. Once the nuts 78 are engaged with the connectors 72, the lower planting arm assembly 4E is fully assembled with the parallel linkage assembly 4 and is ready for farming operation.

Figure 8:
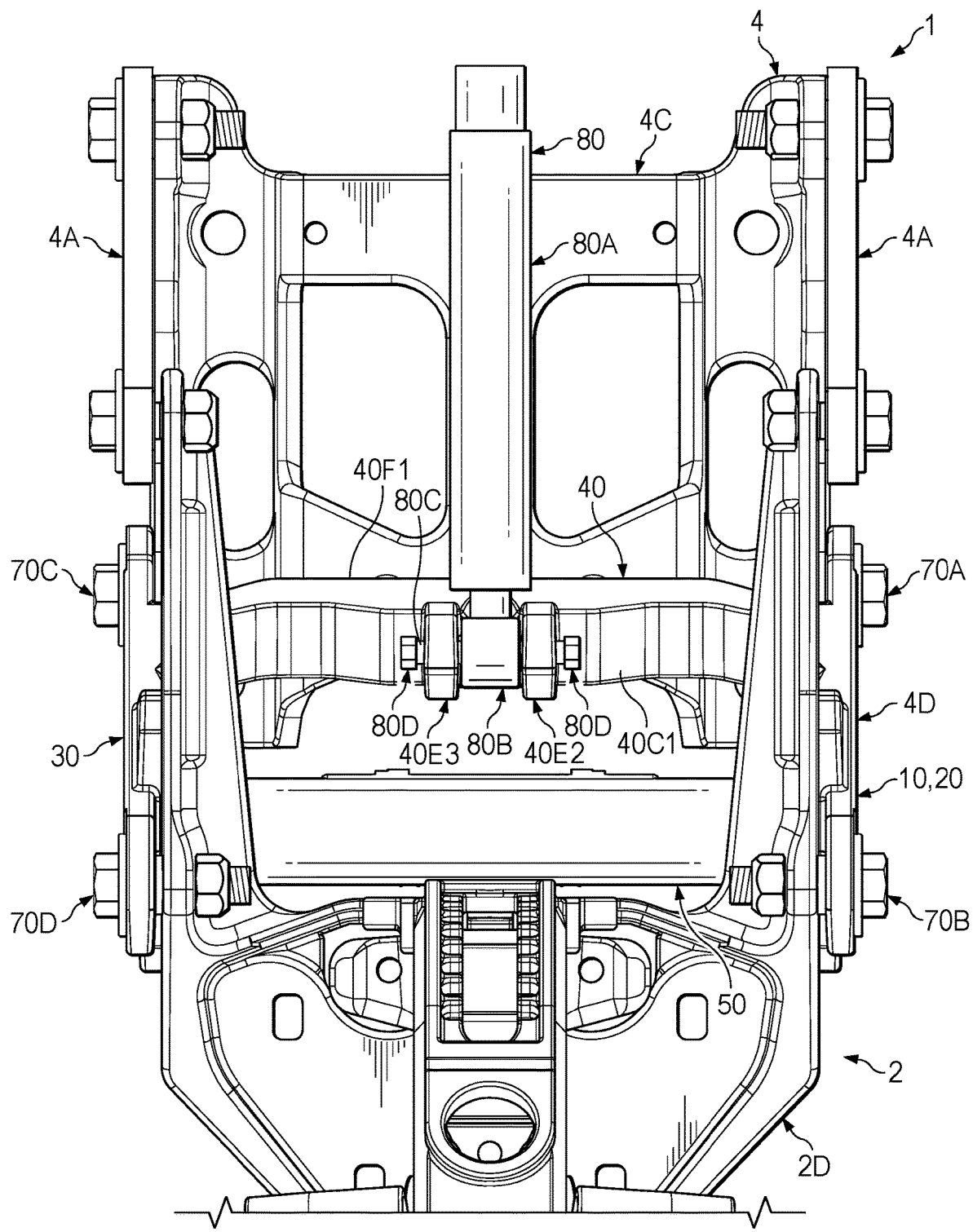
FIG. 8 is a partial front elevation of the row unit, wherein an actuating device is operably engaged with one of a first bracket and a second bracket of the lower planting arm.
Figure 9:
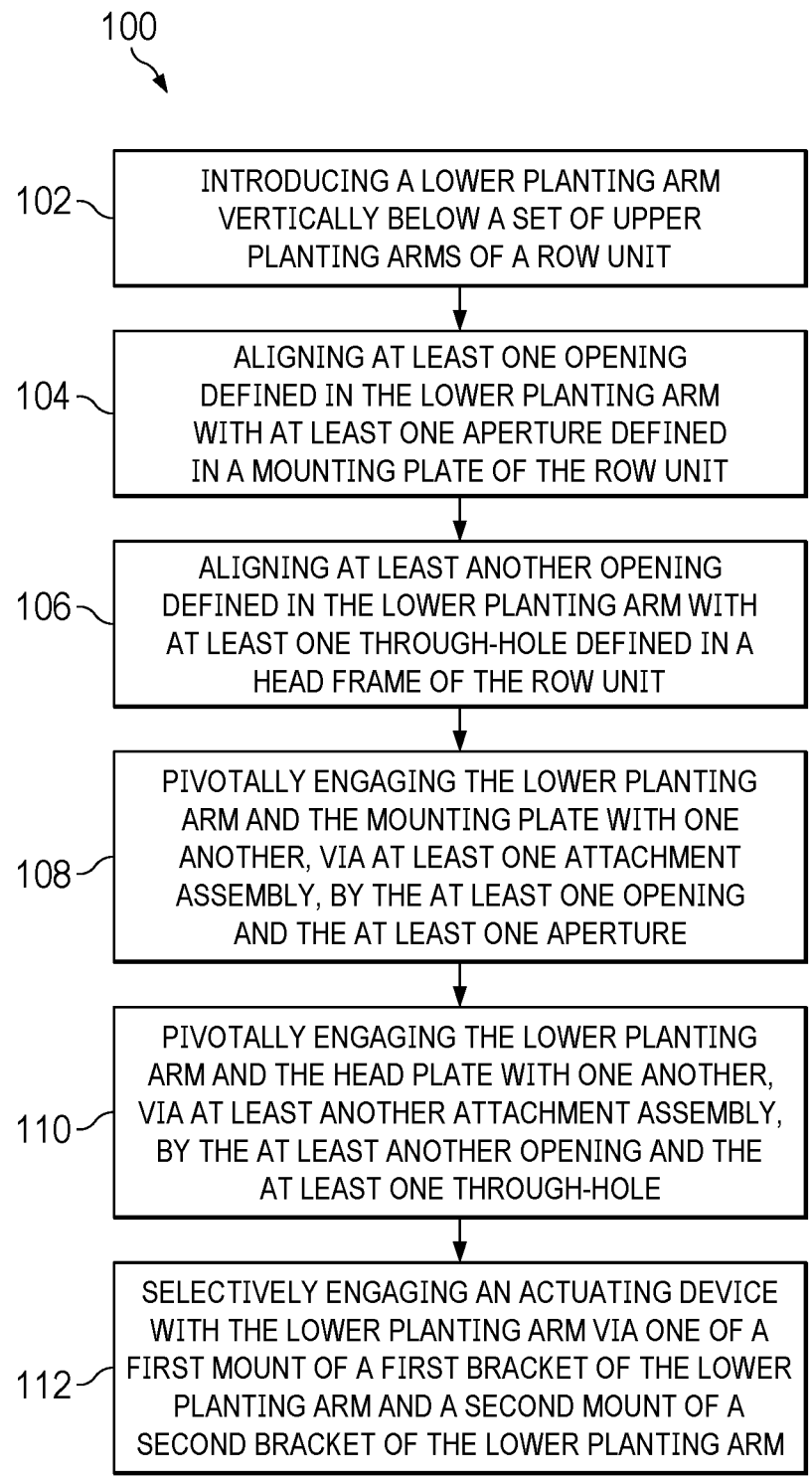
FIG. 9 is an exemplary method flowchart.

As illustrated in FIG. 8, an operator of the row unit 1 may operably engage a smart actuating device or similar device of the like, generally referred to as 80, with the lower planting arm 10. Such use of the smart actuating device 80 may apply downforce to the row unit 1 to maintain the row unit 1 at a predetermined depth when planting seeds into a ground surface. The smart actuating device 80 may include a cylinder 80A configured to house fluid for actuation purposes and a piston rod 80B operably engaged with the cylinder 80A. As best seen in FIG. 8, the smart actuating device is configured to be operably engaged with the first actuator mount 40E of the first bracket 40. As such, a retaining pin or connector 80C may be used to operably engage the piston rod 80B of the smart actuating device 80 with the first extension 40E2 and the second extension 40E3 via the first hole 40E4 and the second hole 40E5. At least one locking members 80D may also operably engage with the retaining pin 80C to maintain the retaining pin 80C with the first actuator mount 40E. Once engaged, the smart actuating device 80 may enable downforce against the first actuator mount 40E to maintain the row unit 1 at a predetermined depth when planting seeds into a ground surface. Specifically, the smart actuating device 80 enables downforce against the first extension 40E2 and the second extension 40E3 of the first actuator mount 40E to maintain the row unit 1 at a predetermined depth when planting seeds into a ground surface.

Such inclusion of the first bracket 40 having the first actuator mount 40E is considered advantageous at least because the first actuator mount 40E enables an operator to quickly attach and detach a smart actuating device with the lower planting arm 10. Conventionally, the first bracket 40 may be a separate and/or independent part that is operably engaged with the mounting plate 4C if an operator chooses to use a smart actuating device with the row unit 1. In this embodiment, however, the operator will always have the option of utilizing the first actuator mount 40E if the operator chooses to retrofit a smart actuating device to a preexisting row unit 1. In a similar instance, the lower planting arm 10 having the first bracket 40 with the first actuator mount 40E may also be included in a new row unit thus giving operators the choice of utilizing a smart actuating device with the new row unit if desired. Furthermore, the configuration of the first bracket 40 with the first actuator mount 40E is adapted to allow any suitable smart actuating device to operably engage with the first actuator mount 40E. In one example, the configuration of the first bracket with the first actuator mount 40E is adapted to enable an operator to operably engage a DeltaForce® device manufactured by Precisions Planting® with the first actuator mount 40E. As such, the first actuator mount 40E enables operators to attach and secure any suitable actuators to the lower planting arm 10 for downforce purposes.

The actuating device described herein may be any suitable smart actuating device that is powered by any suitable energy source (e.g., hydraulically powered, pneumatically powered, electrically powered, etc.) and that is configured to apply downforce to a row unit to maintain the row unit at a predetermined depth when planting seeds into a ground surface. In one exemplary embodiment, a smart hydraulic actuating device that is configured to be operably engaged with a lower planting arm described and illustrated herein may be a DeltaForce® device manufactured by Precisions Planting®. In another exemplary embodiment, a smart pneumatic actuating device that is configured to be operably engaged with a lower planting arm described and illustrated herein may be an AirForce® device manufactured by Precisions Planting®.

In another exemplary embodiment, the operator may also engage a smart actuating device with the second actuator mount 50E of the second bracket 50 if desired.

During farming operations, the lower planting arm 10 pivots about the head frame 2D of the unit shank 2 and the mounting plate 4C of the parallel linkage assembly 4 as the row unit 1 travels over uneven and/or rough terrain. During such pivoting, the inner bushings 76 of the attachment assemblies 70A, 70B, 70C, 70D ride inside of the outer bushings 60A, 60B, 60C, 60D creating a bearing mechanism between the inner bushings 76 of the attachment assemblies 70A, 70B, 70C, 70D. During these farming operations, the inner bushings 76 of the attachment assemblies 70A, 70B, 70C, 70D may become deformed and worn as these inner bushings 76 of the attachment assemblies 70A, 70B, 70C, 70D ride along the outer bushings 60A, 60B, 60C, 60D. Such deformation and wear only occurs to the inner bushings 76 due to the inner bushings 76 being softer than the outer bushings 60. Such configuration of the inner bushings 76 and the outer bushings 60 enables an operator to simply remove the worn inner bushing 76 by removing the associated connector 72 from the lower planting arm 10 and swapping the worn inner bushing 76 with a new inner bushing 76. Such configuration between the inner bushings 76 and the outer bushing 60 prevents unnecessary down time when repairing the row unit 1 and prevents the removal of the entire lower planting arm 10 from the row unit 1 as compared to conventional methods of repairing lower planting arm 10.

While the present disclosure describes and illustrates a single lower planting arm 10, it should be appreciated the row unit 1 may include any suitable number of planting arms described and illustrated along with such planting arms being positioned at any suitable location relative to the mounting plate 4C and/or the head frame 2D. In one example, planting arm 10 may be an upper planting arm 10 where the upper planting arm 10 is positioned at the first opening 2E1 and the second opening 2E3 of the head frame 2D and at the first opening 4D1 and the second opening 4D3 of the mounting plate 4C. In this example, the pair of planting arms 4A are then positioned at the second opening 2E2 and the fourth opening 2E4 of the head frame 2D and at the second opening 4D2 and the fourth opening 4D4 of the mounting plate 4C such that the planting arm 10 is positioned vertically above the pair of planting arms 4A. In another example, two planting arms 10 (e.g., lower and upper parallel arms 10) may be provided with the row unit 1 in which the pair of planting arms 4A are removed and omitted from row unit 1. In this example, the upper planting arm 10 is positioned at the first opening 2E1 and the second opening 2E3 of the head frame 2D and at the first opening 4D1 and the second opening 4D3 of the mounting plate 4C, and the lower planting arm 10 (as shown in FIG. 2) is positioned at the second opening 2E2 and the fourth opening 2E4 of the head frame 2D and at the second opening 4D2 and the fourth opening 4D4 of the mounting plate 4C.

FIG. 8 illustrates a method 100. An initial step 102 of method 100 includes introducing a lower planting arm vertically below a set of upper planting arms of a row unit. Another step 104 of method 100 includes aligning at least one opening defined in the lower planting arm with at least one aperture defined in a mounting plate of the row unit. Another step 106 of method 100 includes aligning at least another opening defined in the lower planting arm with at least one through-hole defined in a head frame of the row unit. Another step 108 of method 100 includes pivotally engaging the lower planting arm and the mounting plate with one another, via at least one attachment assembly, via the at least one opening and the at least one aperture. Another step 110 of method 100 includes pivotally engaging the lower planting arm and the head frame with one another, via at least another attachment assembly, via the at least another opening and the at least one through-hole. Another step 112 of method 100 includes selectively engaging an actuating device with the lower planting arm via one of a first mount of a first bracket of the lower planting arm and a second mount of a second bracket of the lower planting arm.

The method 100 may also include additional steps or optional steps. Optional steps may further include positioning a piston rod of the actuating device between a first extension of the first mount and a second extension of the first mount; introducing a retaining pin of the actuating device to a first hole defined in the first extension; introducing the retaining pin of the actuating device to a second hole defined in the second extension; and securing the piston rod with the first extension and the second extension via the retaining pin. Optional steps may further include engaging a first end of the first bracket with a first linkage arm of the lower planting arm at a first position; engaging a second end of the first bracket with a second linkage arm of the lower planting arm at a second position; engaging a first end of the second bracket with the first linkage arm of the lower planting arm at a third position; and engaging a second end of the second bracket with the second linkage arm of the lower planting arm at a fourth position; wherein the first bracket, the second bracket, the first linkage arm, and the second linkage arm collectively define a single, monolithic member. Optional steps may further include engaging at least one outer bushing with a first material inside of the at least one opening of the lower planting arm; engaging at least one washer of the at least one attachment assembly having a second material with at least one connector of the at least one attachment assembly; engaging at least one inner bushing of the at least one attachment assembly having a third material with the at least one connector; and engaging the at least one inner bushing with the at least one outer bushing; wherein the first material is harder than the second material and the third material. Optional steps may further include engaging at least another outer bushing with a fourth material inside of the at least another opening of the lower planting arm; engaging at least another washer of the at least another attachment assembly having a fifth material with at least another connector of the at least another attachment assembly; engaging at least another inner bushing of the at least another attachment assembly having a sixth material with the at least one connector; and engaging the at least another inner bushing with the at least another outer bushing; wherein the fourth material is harder than the fifth material and the sixth material.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant to MPEP guidelines/requirements and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A lower planting arm of a row unit, comprising:
   a first linkage arm;
   a second linkage arm parallel with the first linkage arm;
   a first bracket fixedly engaging with the first linkage arm and the second linkage arm at a first position;
   a second bracket fixedly engaging with the first linkage arm and the second linkage arm at a second position opposite to the first position;
   a first mount extending outwardly from the first bracket; and a second mount extending outwardly from the second bracket and directly facing the first mount;

wherein each of the first mount and the second mount is adapted to operably engage with an actuating device of the row unit; and wherein the first linkage arm, the second linkage arm, the first bracket, and the second bracket collectively define a single, monolithic member.

2. The lower planting arm of claim 1, wherein the first linkage arm, the second linkage arm, the first bracket, and the second bracket collectively define a substantially parallelogram shape.

3. The lower planting arm of claim 1, wherein the first bracket comprises:

a first end fixedly engaged with the first linkage arm at the first position; and a second end opposite to the first end and fixedly engaged with the second linkage arm at the first position;

wherein the first mount is positioned between the first end of the first bracket and the second end of the first bracket.

4. The lower planting arm of claim 3, wherein the second bracket comprises:

a first end of the second bracket fixedly engaged with the first linkage arm at the second position; and a second end of the second bracket opposite to the first end of the second bracket and fixedly engaged with the second linkage arm at the second position;

wherein the second mount is positioned between the first end of the second bracket and the second end of the second bracket.

5. The lower planting arm of claim 4, further comprising:

a first extension of the first mount positioned between the first end of the first bracket and the second end of the first bracket;

a second extension of the first mount positioned between the first end of the first bracket and the second end of the first bracket; and a first distance defined between the first extension of the first mount and the second extension of the first mount.

6. The lower planting arm of claim 5, further comprising:

a first extension of the second mount positioned between the first end of the second bracket and the second end of the second bracket;

a second extension of the second mount positioned between the first end of the second bracket and the second end of the second bracket; and a second distance defined between the first extension of the second mount and the second extension of the second mount;

wherein the second distance is greater than the first distance.

7. The lower planting arm of claim 6, further comprising:

a first inner surface of the first bracket extending between the first end of the first bracket and the second end of the first bracket and facing in a first direction; and a first outer surface of the first bracket extending between the first end of the first bracket and the second end of the first bracket and facing in a second direction opposite to the first direction;

wherein the first mount operably engages with the first inner surface.

8. The lower planting arm of claim 7, further comprising:

a second inner surface of the second bracket extending between the first end of the second bracket and the second end of the second bracket and facing in a third direction; and a second outer surface of the second bracket extending between the first end of the second bracket and the second end of the second bracket and facing in a fourth direction opposite to the third direction;

wherein the second mount operably engages with the second inner surface and directly faces the first mount.

9. The lower planting arm of claim 1, wherein the first linkage arm comprises:

a first opening defined at a first end of the first linkage arm; and a second opening defined at a second end of the first linkage arm opposite to the first end of the first linkage arm.

10. The lower planting arm of claim 9, wherein the second linkage arm comprises:

a first opening defined at a first end of the second linkage arm; and a second opening defined at a second end of the second linkage arm opposite to the first end of the second linkage arm.

11. The lower planting arm of claim 10, further comprising:

a first pair of outer bushings operably engaged with the first linkage arm inside of the first opening of the first linkage arm and the second opening of the first linkage arm;

wherein each outer bushing of the first pair of outer bushings defines a first material.

12. The lower planting arm of claim 11, further comprising:

a first pair of attachment assemblies operably engaging the first linkage arm with a mounting plate of the row unit and a head frame of the row unit;

each attachment assembly of the first pair of attachment assemblies comprises:

a connector;

a washer operably engaged with the connector and defining a second material; and an inner bushing operably engaged with the connector and defining a third material;

wherein the first material is harder than the second material and the third material.

13. The lower planting arm of claim 12, further comprising:

a second pair of outer bushings operably engaged with the second linkage arm inside of the first opening of the second linkage arm and the second opening of the second linkage arm;

wherein each outer bushing of the second pair of outer bushings defines a fourth material.

14. The lower planting arm of claim 13, further comprising:

a second pair of attachment assemblies operably engaging the second linkage arm with the mounting plate of the row unit and the head frame of the row unit;

each attachment assembly of the second pair of attachment assemblies comprises:

a connector;

a washer operably engaged with the connector and defining a fifth material; and an inner bushing operably engaged with the connector and defining a sixth material;

wherein the fourth material is harder than the fifth material and the sixth material.

15. A method, comprising steps of:

introducing a lower planting arm vertically below a set of upper planting arms of a row unit;

aligning at least one opening defined in at least one linkage arm of the lower planting arm with at least one aperture defined in a mounting plate of the row unit;

aligning at least another opening defined in the at least one linkage arm of the lower planting arm with at least one through-hole defined in a head frame of the row unit;

pivotally engaging the lower planting arm and the mounting plate with one another, via at least one attachment assembly, via the at least one opening and the at least one aperture;

pivotally engaging the lower planting arm and the head frame with one another, via at least another attachment assembly, at the at least another opening and the at least one through-hole; and selectively engaging an actuating device with the lower planting arm via one of a first mount of a first bracket of the lower planting arm and a second mount of a second bracket of the lower planting arm; wherein the first bracket and the second bracket operably engages with the at least one linkage arm.

16. The method of claim 15, further comprising:
positioning a piston rod of the actuating device between a first extension of the first mount and a second extension of the first mount;
introducing a retaining pin of the actuating device to a first hole defined in the first extension;
introducing the retaining pin of the actuating device to a second hole defined in the second extension; and
securing the piston rod with the first extension and the second extension via the retaining pin.

17. The method of claim 15, further comprising:
engaging a first end of the first bracket with a first linkage arm of the lower planting arm at a first position;
engaging a second end of the first bracket with a second linkage arm of the lower planting arm at a second position;
engaging a first end of the second bracket with the first linkage arm of the lower planting arm at a third position; and
engaging a second end of the second bracket with the second linkage arm of the lower planting arm at a fourth position;
wherein the first bracket, the second bracket, the first linkage arm, and the second linkage arm collectively define a single, monolithic member.

18. The method of claim 17, further comprising:
engaging at least one outer bushing with a first material inside of the at least one opening of the lower planting arm;
engaging at least one washer of the at least one attachment assembly having a second material with at least one connector of the at least one attachment assembly;
engaging at least one inner bushing of the at least one attachment assembly having a third material with the at least one connector; and
engaging the at least one inner bushing with the at least one outer bushing;
wherein the first material is harder than the second material and the third material.

19. The method of claim 18, further comprising:
engaging at least another outer bushing with a fourth material inside of the at least another opening of the lower planting arm;
engaging at least another washer of the at least another attachment assembly having a fifth material with at least another connector of the at least another attachment assembly;

engaging at least another inner bushing of the at least another attachment assembly having a sixth material with the at least one connector; and
engaging the at least another inner bushing with the at least another outer bushing;
wherein the fourth material is harder than the fifth material and the sixth material.

20. A lower planting arm of a row unit, comprising:
a first linkage arm having a first opening defined at a first end of the first linkage arm and a second opening defined at a second end of the first linkage arm opposite to the first end of the first linkage arm;
a second linkage arm parallel with the first linkage arm and having a first opening defined at a first end of the second linkage arm and a second opening defined at a second end of the second linkage arm opposite to the first end of the second linkage arm;
a first bracket fixedly engaging with the first linkage arm and the second linkage arm at a first position;
a second bracket fixedly engaging with the first linkage arm and the second linkage at a second position opposite to the first position; wherein each of the first bracket and the second bracket is adapted to operably engage with an actuating device of the row unit;
a first pair of outer bushings operably engaged with the first linkage arm inside of the first opening of the first linkage arm and the second opening of the first linkage arm, wherein each outer bushing of the first pair of outer bushings defines a first material;
a first pair of attachment assemblies operably engaging the first linkage arm with a mounting plate of the row unit and a head frame of the row unit;
each attachment assembly of the first pair of attachment assemblies comprises:
a connector;
a washer operably engaged with the connector and defining a second material; and
an inner bushing operably engaged with the connector and defining a third material;
wherein the first material is harder than the second material and the third material.

21. A lower planting arm of a row unit, comprising:
a first linkage arm having a first opening defined at a first end of the first linkage arm and a second opening defined at a second end of the first linkage arm opposite to the first end of the first linkage arm;
a second linkage arm parallel with the first linkage arm and having a first opening defined at a first end of the second linkage arm and a second opening defined at a second end of the second linkage arm opposite to the first end of the second linkage arm;
a first bracket fixedly engaging with the first linkage arm and the second linkage arm at a first position;
a second bracket fixedly engaging with the first linkage arm and the second linkage at a second position opposite to the first position; wherein each of the first bracket and the second bracket is adapted to operably engage with an actuating device of the row unit;
a first pair of outer bushings operably engaged with the first linkage arm inside of the first opening of the first linkage arm and the second opening of the first linkage arm, wherein each outer bushing of the first pair of outer bushings defines a first material;
a first pair of attachment assemblies operably engaging the first linkage arm with a mounting plate of the row unit and a head frame of the row unit;

each attachment assembly of the first pair of attachment assemblies comprises:
  a connector;
  a washer operably engaged with the connector and defining a second material; and
  an inner bushing operably engaged with the connector and defining a third material;
a second pair of outer bushings operably engaged with the second linkage arm inside of the first opening of the second linkage arm and the second opening of the second linkage arm;
wherein the first material is harder than the second material and the third material;
wherein each outer bushing of the second pair of outer bushings defines a fourth material.

22. A lower planting arm of a row unit, comprising:
a first linkage arm having a first opening defined at a first end of the first linkage arm and a second opening defined at a second end of the first linkage arm opposite to the first end of the first linkage arm;
a second linkage arm parallel with the first linkage arm and having a first opening defined at a first end of the second linkage arm and a second opening defined at a second end of the second linkage arm opposite to the first end of the second linkage arm;
a first bracket fixedly engaging with the first linkage arm and the second linkage arm at a first position;
a second bracket fixedly engaging with the first linkage arm and the second linkage at a second position opposite to the first position; wherein each of the first bracket and the second bracket is adapted to operably engage with an actuating device of the row unit;
a first pair of outer bushings operably engaged with the first linkage arm inside of the first opening of the first linkage arm and the second opening of the first linkage arm, wherein each outer bushing of the first pair of outer bushings defines a first material;
a first pair of attachment assemblies operably engaging the first linkage arm with a mounting plate of the row unit and a head frame of the row unit;
each attachment assembly of the first pair of attachment assemblies comprises:
  a connector;
  a washer operably engaged with the connector and defining a second material; and
  an inner bushing operably engaged with the connector and defining a third material;
a second pair of outer bushings operably engaged with the second linkage arm inside of the first opening of the second linkage arm and the second opening of the second linkage arm;
a second pair of attachment assemblies operably engaging the second linkage arm with the mounting plate of the row unit and the head frame of the row unit;
each attachment assembly of the second pair of attachment assemblies comprises:
  a connector;
  a washer operably engaged with the connector and defining a fifth material; and
  an inner bushing operably engaged with the connector and defining a sixth material;
wherein the first material is harder than the second material and the third material;
wherein each outer bushing of the second pair of outer bushings defines a fourth material; and
wherein the fourth material is harder than the fifth material and the sixth material.

23. A method, comprising steps of:
introducing a lower planting arm vertically below a set of upper planting arms of a row unit;
aligning at least one opening defined in the lower planting arm with at least one aperture defined in a mounting plate of the row unit;
aligning at least another opening defined in the lower planting arm with at least one through-hole defined in a head frame of the row unit;
pivotally engaging the lower planting arm and the mounting plate with one another, via at least one attachment assembly, via the at least one opening and the at least one aperture;
pivotally engaging the lower planting arm and the head frame with one another, via at least another attachment assembly, at the at least another opening and the at least one through-hole;
selectively engaging an actuating device with the lower planting arm via one of a first mount of a first bracket of the lower planting arm and a second mount of a second bracket of the lower planting arm; wherein the first bracket and the second bracket operably engages with the at least one linkage arm;
positioning a piston rod of the actuating device between a first extension of the first mount and a second extension of the first mount;
introducing a retaining pin of the actuating device to a first hole defined in the first extension;
introducing the retaining pin of the actuating device to a second hole defined in the second extension; and
securing the piston rod with the first extension and the second extension via the retaining pin.

24. A method, comprising steps of:
introducing a lower planting arm vertically below a set of upper planting arms of a row unit;
aligning at least one opening defined in the lower planting arm with at least one aperture defined in a mounting plate of the row unit;
aligning at least another opening defined in the lower planting arm with at least one through-hole defined in a head frame of the row unit;
pivotally engaging the lower planting arm and the mounting plate with one another, via at least one attachment assembly, via the at least one opening and the at least one aperture;
pivotally engaging the lower planting arm and the head frame with one another, via at least another attachment assembly, at the at least another opening and the at least one through-hole;
selectively engaging an actuating device with the lower planting arm via one of a first mount of a first bracket of the lower planting arm and a second mount of a second bracket of the lower planting arm; wherein the first bracket and the second bracket operably engages with the at least one linkage arm;
engaging a first end of the first bracket with a first linkage arm of the lower planting arm at a first position;
engaging a second end of the first bracket with a second linkage arm of the lower planting arm at a second position;
engaging a first end of the second bracket with the first linkage arm of the lower planting arm at a third position; and
engaging a second end of the second bracket with the second linkage arm of the lower planting arm at a fourth position;

wherein the first bracket, the second bracket, the first linkage arm, and the second linkage arm collectively define a single, monolithic member.

25. A method, comprising steps of:

introducing a lower planting arm vertically below a set of upper planting arms of a row unit;

aligning at least one opening defined in the lower planting arm with at least one aperture defined in a mounting plate of the row unit;

aligning at least another opening defined in the lower planting arm with at least one through-hole defined in a head frame of the row unit;

pivotally engaging the lower planting arm and the mounting plate with one another, via at least one attachment assembly, via the at least one opening and the at least one aperture;

pivotally engaging the lower planting arm and the head frame with one another, via at least another attachment assembly, at the at least another opening and the at least one through-hole;

selectively engaging an actuating device with the lower planting arm via one of a first mount of a first bracket of the lower planting arm and a second mount of a second bracket of the lower planting arm; wherein the first bracket and the second bracket operably engages with the at least one linkage arm;

engaging a first end of the first bracket with a first linkage arm of the lower planting arm at a first position;

engaging a second end of the first bracket with a second linkage arm of the lower planting arm at a second position;

engaging a first end of the second bracket with the first linkage arm of the lower planting arm at a third position; and engaging a second end of the second bracket with the second linkage arm of the lower planting arm at a fourth position;

engaging at least one outer bushing with a first material inside of the at least one opening of the lower planting arm;

engaging at least one washer of the at least one attachment assembly having a second material with at least one connector of the at least one attachment assembly;

engaging at least one inner bushing of the at least one attachment assembly having a third material with the at least one connector; and engaging the at least one inner bushing with the at least one outer bushing;

wherein the first material is harder than the second material and the third material;

wherein the first bracket, the second bracket, the first linkage arm, and the second linkage arm collectively define a single, monolithic member.

26. A method, comprising steps of:

introducing a lower planting arm vertically below a set of upper planting arms of a row unit;

aligning at least one opening defined in the lower planting arm with at least one aperture defined in a mounting plate of the row unit;

aligning at least another opening defined in the lower planting arm with at least one through-hole defined in a head frame of the row unit;

pivotally engaging the lower planting arm and the mounting plate with one another, via at least one attachment assembly, via the at least one opening and the at least one aperture;

pivotally engaging the lower planting arm and the head frame with one another, via at least another attachment assembly, at the at least another opening and the at least one through-hole;

selectively engaging an actuating device with the lower planting arm via one of a first mount of a first bracket of the lower planting arm and a second mount of a second bracket of the lower planting arm; wherein the first bracket and the second bracket operably engages with the at least one linkage arm;

engaging a first end of the first bracket with a first linkage arm of the lower planting arm at a first position;

engaging a second end of the first bracket with a second linkage arm of the lower planting arm at a second position;

engaging a first end of the second bracket with the first linkage arm of the lower planting arm at a third position; and engaging a second end of the second bracket with the second linkage arm of the lower planting arm at a fourth position;

engaging at least one outer bushing with a first material inside of the at least one opening of the lower planting arm;

engaging at least one washer of the at least one attachment assembly having a second material with at least one connector of the at least one attachment assembly;

engaging at least one inner bushing of the at least one attachment assembly having a third material with the at least one connector; and engaging the at least one inner bushing with the at least one outer bushing;

engaging at least another outer bushing with a fourth material inside of the at least another opening of the lower planting arm;

engaging at least another washer of the at least another attachment assembly having a fifth material with at least another connector of the at least another attachment assembly;

engaging at least another inner bushing of the at least another attachment assembly having a sixth material with the at least one connector; and engaging the at least another inner bushing with the at least another outer bushing;

wherein the first material is harder than the second material and the third material;

wherein the first bracket, the second bracket, the first linkage arm, and the second linkage arm collectively define a single, monolithic member;

wherein the fourth material is harder than the fifth material and the sixth material.

* * * * *